United States Patent
Sugimoto et al.

(10) Patent No.: US 10,559,828 B2
(45) Date of Patent: Feb. 11, 2020

(54) SLURRY FOR LITHIUM ION SECONDARY BATTERY POSITIVE ELECTRODES

(71) Applicant: ZEON CORPORATION, Tokyo (JP)

(72) Inventors: Takumi Sugimoto, Kanagawa (JP); Ikuya Mesuda, Kanagawa (JP)

(73) Assignee: ZEON CORPORATION, Tokyo (JP)

(*) Notice: Subject to any disclaimer, the term of this patent is extended or adjusted under 35 U.S.C. 154(b) by 619 days.

(21) Appl. No.: 14/761,210

(22) PCT Filed: Feb. 4, 2014

(86) PCT No.: PCT/JP2014/052496
§ 371 (c)(1),
(2) Date: Jul. 15, 2015

(87) PCT Pub. No.: WO2014/119790
PCT Pub. Date: Aug. 7, 2014

(65) Prior Publication Data
US 2015/0357648 A1 Dec. 10, 2015

(30) Foreign Application Priority Data
Feb. 4, 2013 (JP) .................................. 2013-019744

(51) Int. Cl.
H01M 4/62 (2006.01)
H01M 10/0525 (2010.01)
H01M 4/139 (2010.01)
H01M 4/02 (2006.01)

(52) U.S. Cl.
CPC ............ *H01M 4/623* (2013.01); *H01M 4/139* (2013.01); *H01M 4/622* (2013.01); *H01M 10/0525* (2013.01); *H01M 2004/028* (2013.01)

(58) Field of Classification Search
CPC .. H01M 4/623; H01M 4/622; H01M 10/0525; H01M 4/139; H01M 2004/028
See application file for complete search history.

(56) References Cited

U.S. PATENT DOCUMENTS

| 2004/0020763 | A1* | 2/2004 | Kanzaki | C08L 23/04 204/250 |
| 2005/0271940 | A1* | 12/2005 | Fukunaga | H01M 4/04 429/217 |
| 2010/0040949 | A1 | 2/2010 | Nanno et al. | |
| 2011/0014521 | A1* | 1/2011 | Matsuyama | H01M 4/0404 429/217 |
| 2011/0143198 | A1* | 6/2011 | Choi | C08L 27/16 429/217 |
| 2013/0017440 | A1* | 1/2013 | Takano | H01M 4/139 429/211 |

FOREIGN PATENT DOCUMENTS

| EP | 2621005 | * 7/2013 | ............ H01M 4/62 |
| JP | 2003-157829 A | 5/2003 | |
| JP | 2004-303572 A | 10/2004 | |
| JP | 2006-107896 A | 4/2006 | |
| JP | 2009-026515 A | 2/2009 | |
| JP | 2012-054147 | * 3/2012 | ............ H01M 4/62 |
| JP | 2012-99251 A | 5/2012 | |
| JP | 2012-190731 A | 10/2012 | |
| WO | WO2012/039366 | * 3/2012 | ............ H01M 4/62 |

OTHER PUBLICATIONS

Machine English translation of JP2012-054147 to Sony (Year: 2012).*
Extended European Search Report dated Jul. 7, 2016 in related European application No. 14746247.7-1373.
International Search Report; PCT/JP2014/052496; dated May 2, 2014.
International Preliminary Report on Patentability (Chapter I) and Translation of Written Opinion of the International Searching Authority; PCT/JP2014/052496 dated Aug. 4, 2015.

* cited by examiner

*Primary Examiner* — Michael L Dignan
(74) *Attorney, Agent, or Firm* — Studebaker & Brackett PC

(57) ABSTRACT

A slurry for a lithium ion secondary battery positive electrodes contains a positive electrode active material, a binder, a conductive material, and an organic solvent. The binder contains a nitrile group-containing acrylic polymer and a fluorine-containing polymer; and the viscosity ratio ((viscosity at a shear rate of 2 sec$^{-1}$)/(viscosity at a shear rate of 20 sec$^{-1}$)) of this slurry as measured by a coaxial double cylinder viscometer is 1.0-2.5. Positive electrodes produced using the slurry have excellent weight accuracy, and lithium ion secondary batteries produced with positive electrodes produced from the slurry have a high capacity and excellent cycle characteristics at high potentials. The produced lithium ion secondary battery is flexible and free from the occurrence of cracks in an active material layer when bent.

10 Claims, No Drawings

SLURRY FOR LITHIUM ION SECONDARY BATTERY POSITIVE ELECTRODES

TECHNICAL FIELD

The present invention relates to a slurry for a lithium ion secondary battery positive electrodes, and further specifically it relates to the slurry for the lithium ion secondary battery positive electrode capable of having higher capacity.

BACKGROUND ART

Recently, the portable terminals such as laptop computer, mobile phone and PDA are widely used. For secondary batteries used for power sources of these portable terminals, nickel hydrogen secondary battery, lithium ion secondary battery or so are heavily used. The portable terminals are rapidly downsized, made thinner, have become lighter, and has higher performance. As a result, the portable terminals are used in various occasions.

Also, for the battery, it is required to be smaller, thinner, and lighter and to have higher performance as similar to the portable terminals. Also, in order to increase the blending amount of the active material in the active material layer in order to have higher capacity for the battery, it is demanded to reduce the material such as the binder for fixing the active material on the current collector, or the conductive material for securing the conductivity.

In order to have higher capacity for the lithium ion secondary battery, the lithium ion secondary battery negative electrode using the alloy based active material comprising Si or so was is developed (for example, the patent document 1). Along with having higher capacity, the voltage during the charging-discharging are becoming higher, and for the electrolytic solution made of ethylene carbonate or propylene carbonate or so, it cannot withstand the high voltage and may decompose, thus the fluorine based electrolytic solution additives are used together.

On the other hand, for the positive electrode, as for the binder, the fluorine containing polymer such as polyvinylidene fluoride (PVdF) or so has been used. Fluorine containing polymer does not dissolve to the electrolytic solution, thus the stable binding property can be expected, however the fluorine containing polymer such as PVdF is hard and it is difficult to bend. Therefore, depending on the shape or the size of the battery, when only using the fluorine containing polymer in case of molding into a predetermined shape by pressing after winding the electrode, the cracks may be formed to the active material layer.

Hence, as the binder used for the positive electrode, it's being considered to together use the fluorine containing polymer and nitrile rubber (for example, the patent document 2), or the fluorine containing polymer and crosslinked acrylate based polymer (for example, the patent document 3)

PRIOR ART DOCUMENT

Patent document 1: JP Patent No. 4025995
Patent document 2: JP Patent No. 3598153
Patent document 3: JP Patent No. 4929573

SUMMARY OF THE INVENTION

Technical Problems to be Solved by the Invention

However, for the patent document 2, the fluorine containing polymer and the nitrile rubber are together used as the binder, however the amount of the binder increases, and the active material density relatively declines, hence sufficient battery capacity may not be obtained. Also, the amount of the binder increases, thus the swelling degree of the active material layer against the electrolytic solution also increases, and particularly the release strength during the high electrical potential cycle will decline and the cycle characteristic may deteriorate.

Also, in the patent document 3, the crosslinked acrylate based polymer is used as the binder, hence the swelling of the active material layer against the electrolytic solution can be suppressed, however the crosslinked acrylate based polymer is present in a particulate form, hence the dispersibility becomes insufficient. As a result, the target accuracy during the coating of the positive electrode slurry declines. That is, the smoothness of the coated electrode declines, thereby the high electrical potential cycle may decline.

Therefore, the object of the present invention is to provide the positive electrode slurry capable of producing the high capacity lithium ion secondary battery, having excellent target accuracy during the coating, having flexibility does not generate cracks on the active material layer during the bending, and having excellent in the high electrical potential cycle characteristic.

The present inventors have carried out keen examination to solve the above objects. As a result, it was found that the decline of the target accuracy during the coating is caused by the viscosity of the positive electrode slurry, particularly by the viscosity ratio when measured at the different shear speed using a coaxial cylinder type viscometer. Then, it was found that, for the positive electrode slurry obtained by the patent document 3, a higher viscosity ratio is obtained when measured at different shear speed using coaxial cylinder type viscometer.

As a result of further keen examination, it was found that the positive electrode slurry having excellent dispersibility or the target accuracy during the coating can be obtained by using nitrile group containing acrylic polymer as the positive electrode binder, and by setting the ratio of the viscosity measured by coaxial cylinder type viscometer to within a specific ratio. Also, according to said positive electrode slurry, by including the conductive material in the positive electrode, higher capacity can be obtained, and also the positive electrode becomes flexible, with no crack in the positive electrode active material layer when bending, and with high positive electrode active material density can be obtained by using the nitrile group acrylic polymer and the fluorine containing polymer together as the positive electrode binder. Further, it was found that the high capacity lithium ion secondary battery having excellent output characteristic and the high electrical potential cycle characteristic can be obtained. Thereby, the present invention was attained based on these findings.

The gist of the present invention is as described in below.

[1] A slurry for a lithium ion secondary battery positive electrode comprising a positive electrode active material, a binder, a conductive material, and an organic solvent, wherein
said binder comprises a nitrile group containing acrylic polymer and a fluorine containing polymer,
a ratio of a viscosity measured by a coaxial cylinder type viscometer ((the viscosity at a shear speed of 2 $\sec^{-1}$)/(the viscosity at the shear speed of 20 $\sec^{-1}$)) is 1.0 to 2.5.

[2] The slurry for the lithium ion secondary battery positive electrode as set forth in [1], wherein said fluorine containing polymer is polyvinylidene fluoride.

[3] The slurry for the lithium ion secondary battery positive electrode as set forth in [1] or [2], wherein a weight average molecular weight of said nitrile group containing acrylic polymer is 100,000 to 2,000,000.

[4] The slurry for the lithium ion secondary battery positive electrode as set forth in any one of [1] to [3], wherein a melt viscosity of said fluorine containing polymer measured at a temperature of 232° C. and the shear speed of 100 sec$^{-1}$ is 10 to 100 kpoise.

[5] The slurry for the lithium ion secondary battery positive electrode as set forth in any one of [1] to [4], wherein a content of said binder is 0.8 to 3 parts by weight with respect to 100 parts by weight of the positive electrode active material.

[6] The slurry for the lithium ion secondary battery positive electrode as set forth in any one of [1] to [5], wherein a content ratio of the nitrile group containing acrylic polymer in said binder is 5 to 50 wt %.

[7] The slurry for the lithium ion secondary battery positive electrode as set forth in any one of [1] to [6], wherein a content of said conductive material is 1 to 3 parts by weight with respect to 100 parts by weight of the positive electrode active material.

[8] The slurry for the lithium ion secondary battery positive electrode as set forth in any one of [1] to [7], wherein a number average particle diameter of said conductive material is 5 to 40 nm.

[9] A production method of the slurry for the lithium ion secondary battery positive electrode as set forth in [1] to [8], comprising a step of obtaining a thick paste having a solid concentration of 77 to 90 wt % by kneading the positive electrode, the nitrile group containing acrylic polymer, the fluorine containing polymer and conductive material in the organic solvent at 350 to 1000 W/kg for 15 to 120 minutes, and a step of obtaining a dispersion having the solid concentration of 70 to 76 wt % by diluting said thick paste by the organic solvent.

[10] A production method of the lithium ion secondary battery positive electrode comprising a step of forming a positive electrode active material layer by coating and drying the slurry for the lithium ion secondary battery as set forth in any one of [1] to [8].

[11] A lithium ion secondary battery comprising a positive electrode, a negative electrode and non-aqueous electrolytic solution, and said positive electrode is the lithium ion secondary battery positive electrode obtained from the production method as set forth in [10].

[12] The lithium ion secondary battery as set forth in [11] wherein said negative electrode comprises an alloy based active material.

Effect of the Present Invention

According to the slurry for the lithium ion secondary battery positive electrode of the present invention, by using the fluorine containing polymer and nitrile group containing acrylic polymer together, and by setting the ratio of the viscosity measured by the coaxial cylinder type viscometer within specific range, the dispersibility of the positive electrode active material and the conductive material improves, thereby exhibits excellent target accuracy during the coating, that is exhibits excellent smoothness of the coated electrode. Also, according to the flexible positive electrode slurry, the positive electrode, without having a crack in the positive electrode active material layer during the bending, and having high positive electrode active material density can be obtained. Also, the lithium ion secondary battery having excellent output characteristic or high electrical potential cycle characteristic, and also the high initial capacity can be provided.

Means for Solving the Problems

Hereinafter, the present invention will be described in detail. The slurry for the lithium ion secondary battery positive electrode (hereinafter, it may be referred as "positive electrode slurry") according to the present invention comprises the positive electrode, the binder (hereinafter, it may be referred as "positive electrode binder"), the conductive material and the organic solvent. Hereinbelow, each component will be explained in further detail.

(A) The Positive Electrode Active Material

As the positive electrode active material, the active material capable of inserting and releasing the lithium ion is used, and such positive electrode active material is largely separated into those made of inorganic compounds and those made of organic compounds.

As the positive electrode active material made of an inorganic material, a transition metal oxide, a transition metal sulfide, and lithium containing complex metal oxide made of lithium and the transition metal or so may be mentioned. As the transition metal mentioned in above, Ti, V, Cr, Mn, Fe, Co, Ni, Cu, Mo or so may be used.

As the transition metal oxide, MnO, $MnO_2$, $V_2O_5$, $V_6O_5$, $V_6O_{13}$, $TiO_2$, $Cu_2V_2O_3$, amorphous $V_2O$—$P_2O_5$, $MoO_3$, $V_2O_5$, $V_6O_{13}$ or so may be mentioned, and among these, MnO, $V_2O_5$, $V_6O_{13}$, $TiO_2$ are preferable from the point of cycle characteristic and the capacity.

As for the transition metal sulfide, $TiS_2$, $TiS_3$, amorphous $MoS_2$, FeS or so may be mentioned.

As the lithium containing complex metal oxide, for example the lithium containing complex metal oxide having a layered structure, the lithium containing complex metal oxide having a spinel structure, and the lithium containing complex metal oxide having olivine type structure or so may be mentioned.

As for the lithium containing complex metal oxide having a layered structure, for example, lithium containing cobalt oxide ($LiCoO_2$), lithium containing nickel oxide ($LiNiO_2$), lithium complex oxide of Co—Ni—Mn (Li(Co Mn Ni)$O_2$), lithium rich layered compound (Li[$Ni_{0.17}Li_{0.2}Co_{0.07}Mn_{0.56}$]$O_2$), lithium complex oxide of Ni—Mn—Al, lithium complex oxide of Ni—Co—Al or so may be mentioned.

As the lithium containing complex metal oxides having spinel structure, for example $Li_a[Mn_{3/2}M_{1/2}]O_4$ (here, M is Cr, Fe, Co, Ni, Cu or so) of which a part of Mn or lithium manganite ($LiMn_2O_4$) is substituted with other transition metal or so may be mentioned.

As the lithium containing complex metal oxide having olivine structure, the olivine type lithium phosphate compound expressed by $Li_XMPO_4$ (here, M is at least one selected from the group consisting of Mn, Fe, Co, Ni, Cu, Mg, Zn, V, Ca, Sr, Ba, Ti, Al, Si, B and Mo, and $0 \leq X \leq 2$) or so may be mentioned.

Among these, since the cycle characteristic and the initial capacity are excellent, lithium containing cobalt oxide ($LiCoO_2$), lithium containing nickel oxide ($LiNiO_2$), lithium complex oxide of Co—Ni—Mn (Li(Co Mn Ni)$O_2$), lithium rich layered compound (Li[$Ni_{0.17}Li_{0.2}Co_{0.07}Mn_{0.56}$]$O_2$), the lithium containing complex metal oxide ($LiNi_{0.5}Mn_{1.5}O_4$) having a spinel structure are preferable, and lithium containing cobalt oxide (LiCoO$_2$) and lithium rich layered compound (Li[Ni$_{0.17}$Li$_{0.2}$Co$_{0.07}$Mn$_{0.56}$]O$_2$) are more preferable.

As the positive electrode active material made of the organic compound, a conductive polymer such as polyacetylene and poly-p-phenylene or so can be used.

Also, an iron-based oxide which is poor in electric conductivity may be subject to reduction firing in the presence of the carbon source substance and can be used as a positive electrode active material coated with carbon material.

Also, these compounds may be element substituted partially.

The positive electrode active material for the lithium ion secondary battery may be a mixture of the above mentioned inorganic compound and the organic compound.

The volume average particle diameter of the positive electrode active material is usually 1 to 50 μm, and more preferable 2 to 30 μm. When the volume average particle diameter of the positive electrode active material is within above mentioned range, the amount of the positive electrode binder in the positive electrode active material layer can be reduced, thereby the capacity decline of the lithium ion secondary battery can be suppressed. Also, the positive electrode slurry of the present invention becomes easy to regulate to appropriate viscosity for coating; hence the uniform positive electrode active material layer can be obtained.

The content ratio of the positive electrode active material in the positive electrode slurry is 90 to 99.9 wt %, more preferably 95 to 99 wt % in solid equivalent amount. When the content ratio of the positive electrode active material in the positive electrode slurry is within the above range, while the positive electrode produced by using the positive electrode slurry exhibit high capacity, it also exhibits excellent flexibility and binding property.

(B) the Positive Electrode Binder

The positive electrode binder (B) includes nitrile group containing acrylic polymer (B1) and fluorine containing polymer (B2).

(B1) the Nitrile Group Containing Acrylic Polymer

The nitrile group containing acrylic polymer is the polymer comprising nitrile group containing monomer unit and (meth)acrylate monomer unit, and depending on the needs further comprises monomer unit derived from other monomer units such as ethylenic unsaturated monomer unit, conjugated diene monomer unit and crosslinkable monomer unit. These monomer units are the structural unit formed by polymerizing these monomers, and for example the nitrile group containing monomer unit is the structural unit formed by polymerizing the nitrile group containing monomer. Here, the content ratio of each monomer unit usually matches each monomer (used amount) in the total monomer used for the polymerization of nitrile group containing acrylic polymer.

As the specific example of the nitrile group containing monomer, acrylonitrile or methacrylonitrile or so may be mentioned, and among these, acrylonitrile is preferable from the point of enhancing the adhesiveness between the current collector and of improving the positive electrode strength.

The content ratio of the nitrile group containing monomer unit in the nitrile group containing acrylic polymer (B1) is preferably within the range of 5 to 35 wt %, more preferably 10 to 30 wt %, and particularly preferably 15 to 25 wt %. When the amount of the nitrile group containing monomer unit is within the above range, the adhesiveness between the current collector is excellent and the strength of the obtained positive electrode is improved.

The (meth)acrylate monomer unit is the structural unit obtained by polymerizing the monomer unit derived from the compound expressed by the general formula (1): CH$_2$=CR$^1$—COOR$^2$ (in said formula, R$^1$ is hydrogen atom or methyl group, R$^2$ is alkyl group or cycloalkyl group).

As the specific example of the monomer expressed by the general formula (1), acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, lauryl acrylate, stearyl acrylate or so; methacrylates such as methyl methacrylates, ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, lauryl methacrylate, stearyl methacrylate or so may be mentioned. Among these, acrylates are preferable, and n-butyl acrylate and 2-ethylhexyl acrylate are particularly preferable as these can improve the strength of the obtained positive electrode.

(Meth)acrylate monomer may be used alone, or by combining two or more thereof in arbitrary ratio. Therefore, nitrile group containing acrylic polymer (B1) may comprises only one (meth)acrylate monomer, and it may comprise two or more thereof in arbitrary ratio.

The content ratio of (meth)acrylate monomer unit in the nitrile group containing acrylic polymer (B1) is preferably 35 to 85 wt %, more preferably 45 to 75 wt %, and particularly preferably 50 to 70 wt %. If the nitrile group containing polymer (B1) is used in which the content ratio of (meth)acrylate monomer unit is within the above mentioned range, the flexibility of the positive electrode is enhanced, and the swelling property against the non-aqueous electrolytic solution used for the lithium ion secondary battery can be suppressed adequately. Also, the heat resistance can be enhanced, and the internal resistance of the obtained positive electrode can be made small.

The nitrile group containing acrylic polymer may comprise ethylenic unsaturated acid monomer unit in addition to the above mentioned nitrile group containing monomer unit and (meth)acrylate monomer unit.

Ethylenic unsaturated acid monomer unit is the structural unit formed by polymerizing ethylenic unsaturated acid monomer. Ethylenic unsaturated monomer is ethylenic unsaturated monomer comprising acid group such as carboxyl group, sulfonic group, or phosphine group or so, and it is not limited to specific monomer. The specific example of ethylenic unsaturated monomer is ethylenic unsaturated carboxylic acid monomer, ethylenic unsaturated sulfonic acid monomer, ethylenic unsaturated phosphoric acid monomer or so.

As specific example of ethylenic unsaturated carboxylic acid monomer, ethylenic unsaturated monocarboxylic acid and the derivative thereof, ethylenic unsaturated dicarboxylic acid and acid anhydride and derivative thereof may be mentioned.

As the examples of ethylenic unsaturated monocarboxylic acid, acrylic acid, methacrylic acid, and crotonic acid may be mentioned.

As the derivative of ethylenic monocarboxylic acid, 2-ethylacrylic acid, isocrotonic acid, α-acetoxy acrylic acid, β-trans-aryloxy acrylic acid, α-chloro-β-E-methoxy acrylic acid, β-diamino acrylic acid or so may be mentioned.

As ethylenic unsaturated dicarboxylic acid, maleic acid, fumaric acid, itaconic acid or so may be mentioned.

As acid anhydride of ethylenic unsaturated dicarboxylic acid, maleic acid anhydride, acrylic acid anhydride, methyl maleic acid anhydride, dimethyl maleic acid anhydride, or so may be mentioned.

As derivative of ethylenic unsaturated dicarboxylic acid, methyl allylmaleate such as methylmaleic acid, dimethyl maleic acid, phenylmaleic acid, chloromaleic acid, dichloromaleic acid, fluoromaleic acid or so; maleates such as diphenyl maleate, nonyl maleate, decyl maleate, dodecyl maleate, octadecyl maleate, and fluoroalkyl maleate or so may be mentioned.

As specific examples of ethylenic unsaturated sulfonic acid monomer, vinyl sulfonate, methylvinyl sulfonate, styrene sulfonate, (meth)acrylic sulfonate, (meth)acrylic acid-2-ethylsulfonate, 2-acrylicamide-2-hydroxypropane sulfonate, 2-acrylamide-2-methylpropane sulfonate or so may be mentioned.

As specific examples of ethylenic unsaturated phosphoric acid monomer, (meth)acrylic acid-3-chloro-2-propyl phosphate, (meth)acrylic acid-2-ethyl phosphate, 3-allyloxy-2-hydroxypropyl phosphate or so may be mentioned.

Also, alkali metal salts or ammonium salts of above mentioned ethylenic unsaturated acid monomer can be used.

The above mentioned ethylenic unsaturated acid monomer can be used alone or by combining two or more thereof in arbitrary ratio. Therefore, nitrile group containing acrylic polymer (B1) may include only one type of ethylenic unsaturated acid monomer, or it may comprise two or more types thereof in arbitrary ratio.

Among these, from the point of improving the dispersibility of nitrile group containing acrylic polymer (B1), as for the ethylenic unsaturated acid monomer, preferably ethylenic unsaturated carboxylic acid monomer or ethylenic unsaturated sulfonic acid monomer are used alone, or ethylenic unsaturated carboxylic acid monomer and ethylenic unsaturated sulfonic acid monomer are used together; and more preferably ethylenic unsaturated carboxylic acid monomer and ethylenic unsaturated sulfonic acid monomer are used together.

Among ethylenic unsaturated carboxylic acid monomer, in order for the nitrile group containing acrylic polymer (B1) to exhibit good dispersibility, preferably it is ethylenic unsaturated monocarboxylic acid, more preferably acrylic acid or methacrylic acid, and particularly preferably methacylic acid.

Also, among ethylenic unsaturated sulfonic acid monomer, in order for the nitrile group containing acrylic polymer (B1) to exhibit good dispersibility, preferably it is preferably 2-acrylamide-2-hydroxypropane sulfonate, 2-acrylamide-2methylpropane sulfonate, and more preferably 2-acrylamide-2-methylpropane sulfonate.

The content ratio of ethylenic unsaturated acid monomer in the nitrile group acrylic polymer (B1) is preferably 10 to 30 wt %, more preferably 12 to 28 wt %, and particularly preferably 14 to 26 wt %. In case of using ethylenic unsaturated carboxylic acid monomer and ethylenic unsaturated sulfonic acid monomer together as the ethylenic unsaturated acid monomer, the content ratio of ethylenic unsaturated carboxylic acid monomer in the nitrile group acrylic polymer (B1) is preferably 10 to 30 wt %, more preferably 12 to 28 wt %; and the content ratio of ethylenic unsaturated sulfonic acid monomer is preferably 0.1 to 10 wt %.

By setting the content ratio of ethylenic unsaturated acid monomer, the nitrile group containing acrylic polymer (B1) has high dispersibility when forming a slurry, the positive electrode active material layer with high uniformity can be formed, and also the resistance of the positive electrode can be lowered.

The nitrile group containing acrylic polymer (B1) may include conjugated diene monomer unit in addition to above mentioned monomer unit comprising the above mentioned nitrile group and (meth)acrylate monomer unit. The conjugated diene monomer unit is a structural unit formed by polymerizing the structural unit formed by polymerizing the conjugated diene monomer and/or the conjugated diene monomer, then further hydrogenating it.

As the conjugated diene monomer, for example 1,3-butadiene, isoprene, 2,3-dimethyl-1,3-butadiene, 1,3-pentadiene, chloroprene or so may be mentioned; preferably it is 1,3-butadiene and isoprene, and more preferably 1,3-butadiene. The above mentioned conjugated diene monomer may be used alone, or by combining two or more type in arbitrary ratio. Therefore, the nitrile group containing acrylic polymer (B1) may include only one type of conjugated diene monomer unit, or it may include two or more type by combining in arbitrary ratio.

The content ratio of the conjugated diene monomer unit (the content ratio including the hydrogenated monomer unit) in the nitrile group containing acrylic polymer (B1) is preferably 20 to 98 wt %, more preferably 20 to 80 wt %, and particularly 20 to 70 wt %.

The nitrile group containing polymer (B1) may further include, in addition to above mentioned monomer unit, the crosslinkable monomer unit within the range which does not influence THF insoluble amount of the nitrile group containing acrylic polymer (B1). The crosslinkable monomer unit is a structural unit capable of forming the crosslinked structure during or after the polymerization, by heat applying or energy ray irradiation to the crosslinkable monomer. As example of the crosslinkable monomer, usually the monomer comprising the heat-crosslinkable type may be mentioned. Further specifically, monofunctional monomer comprising crosslinkable group of heat-crosslinkable type and one olefinic double bond per one molecule, and polyfunctional monomer comprising two or more olefinic double bond per one molecule may be mentioned.

As the example of the crosslinkable group of heat-crosslinkable type included in the monofunctional monomer, epoxy group, N-methylol amide group, oxetanyl group, oxazoline group and the combination thereof may be mentioned. Among these, epoxy group is more preferable form the point that the regulation of the crosslinking and the crosslinking density are easy.

As the example of crosslinkable monomer comprising epoxy group as the crosslinkable group of the heat-crosslinkable type, and comprising olefinic double bond, unsaturated glycidyl ether such as vinyl glycidyl ether, allyl glycidyl ether, butenyl glycidyl ether, o-allyl phenyl glycidyl ether or so; monoepoxide of diene or polyene such as butadiene monoepoxide, chloroprene monoepoxide, 4,5-epoxy-2-pentene, 3,4-epoxy-1-vinyl cyclohexene, 1,2-epoxy-5,9-cyclododecadiene or so; alkenylepoxides such as 3,4-epoxy-1-butene, 1,2-epoxy-5-hexene, 1,2-epoxy-9-decene or so; glycidyl esters of unsaturated carboxylic acid such as glycidyl acrylate, glycidyl methacrylate, glycidyl crotnate, glycidyl-4-heptonoate, glycidyl sorbate, glycidyl linoleate, glycidyl-4-methyl-3-pentenoate, glycidyl ester of 3-cyclohexene carboxylic acid, glycidyl ester of 4-methyl-3-cyclohexene carboxylic acid or so may be mentioned.

As the example of crosslinkable monomer comprising N-methylol amide group as the crosslinkable group of heat-crosslinkable type and comprising olefinic double bond, (meth)acrylic amides comprising methylol group such as N-methylol (meth)acrylic amide or so may be mentioned.

As the example of crosslinkable monomer comprising oxetanyl group as the crosslinkable group of heat-crosslinkable type, and comprising olefinic double bond, 3-((meth) acryloyloxymethyl) oxetane, 3-((meth)acryloyloxymethyl)-2-trifluoromethyl oxetane, 3-((meth)acryloyloxymethyl)-2-phenyl oxetane, 2-((meth)acryloyloxymethyl)) oxetane, and 2-((meth)acryloyloxymethyl))-4-trifluoromethyl oxetane or so may be mentioned.

As the example of the crosslinkable monomer comprising oxazoline group as the crosslinkable group of heat-crosslinkable type, and comprising olefinic double bond, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazolineor so may be mentioned.

As the example of the polyfunctional monomer comprising two or more olefinic double bonds, allyl(meth)acrylate, ethylene di(meth)acrylate, diethylene glycol di(meth)acrylate, triethylene glycol di(meth)acrylate, tetraethylene glycol di(meth)acrylate, trimethylol propane-tri(meth)acrylate, dipropylene glycol diallylether, polyglycol diallylether, triethylene glycol divinylether, hydroquinone diallylether, tetraallyloxy ethane, trimethylol propane-diallyl ether, allyl or vinylether of polyfunctional alcohol of other the above mentioned, triallylamine, methylene bisacrylamide, and divinyl benzene or so may be mentioned.

As the crosslinkable monomer, particularly allyl(meth) acrylate, ethylene di(meth)acrylate, allylglycidyl ether, and glycidyl(meth)acrylate or so can be preferably used.

The above mentioned crosslinkable monomer can be used alone, or by combining two or more type thereof in arbitrary ratio. Therefore, the nitrile group containing acrylic polymer (B1) may include only one type of the crosslinkable monomer, or may include two or more type by combining in arbitrary ratio.

In case the crosslinkable monomer unit is included in the nitrile group containing acrylic polymer (B1), the content ratio thereof is preferably 0.1 wt % or more, more preferably 0.2 wt % or more, and particularly preferably 0.5 wt % or more; and preferably 5 wt % or less, more preferably 4 wt % or less, and particularly preferably of 2 wt % or less. By setting the content ratio of the crosslinkable monomer unit above the lower limit, the weight average molecular weight of the nitrile group containing acrylic polymer (B1) is increased, and the swelling degree can be prevented from increasing excessively. On the other hand, by setting the ratio of the crosslinkable monomer unit below the upper limit of the above range, the dispersibility of the nitrile group containing polymer (B1) can be enhanced. Therefore, by setting the content ratio of the crosslinkable monomer unit within said range, the swelling degree and the dispersibility both can be enhanced.

Also, the nitrile group containing acrylic polymer (B1) may include, in addition to the above mentioned, aromatic vinyl monomer unit, ethylenic unsaturated carboxylic acid amide monomer unit or so.

As the example of the aromatic vinyl monomer, styrene, α-methyl styrene, vinyl toluene, chlorostyrene, hydroxyl methyl styrene or so may be mentioned.

As the example of ethylenic unsaturated carboxylic acid amide monomer, (meth)acrylic amide, N-methoxymethyl (meth)acrylic amide or so may be mentioned.

By comprising these monomer units, the nitrile group containing acrylic polymer (B1) has high dispersibility when forming a slurry, the positive electrode active material layer with high uniformity can be formed, and also the resistance of the positive electrode can be lowered.

Here, the content ratio of each monomer is usually the same as the content ratio of each monomer unit (for example of nitrile group containing monomer unit, (meth)acrylate monomer unit, ethylenic unsaturated acid monomer unit, conjugated diene monomer unit and crosslinkable monomer unit) in the nitrile group containing acrylic polymer.

Next, the swelling degree against the non-aqueous electrolytic solution of the nitrile group containing acrylic polymer (B1), and tetrahydrofuran (THF) insoluble amount of the nitrile group containing acrylic polymer (B1) will be explained.

The swelling degree of the nitrile group containing acrylic polymer (B1) against the non-aqueous electrolytic solution is preferably 1.0 times or more and 3 times or less, more preferably 1.0 times or more and 2.8 times or less, further preferably 1.0 times or more and 2.6 times or less, thereby the significant change of the volume of said polymer in the electrolytic solution can be prevented. Here, non-aqueous electrolytic solution is the electrolytic solution constituting the lithium ion secondary battery according to the present invention. By setting the swelling degree of the nitrile group containing acrylic polymer (B1) against the non-aqueous electrolytic solution within the above range, even when the charge-discharge cycle is repeated, the adhesiveness against the current collector of the positive electrode active material layer is maintained, and the cycle characteristic improves. The swelling degree against the non-aqueous electrolytic solution can be controlled for example by the content ratio of each monomer unit mentioned in above. Specifically, when the content ratio of the nitrile group containing monomer unit increases, it increases as well. Also, when the content ratio of the ethylenic unsaturated monomer unit is increased, it declines.

Also, the tetrahydrofuran (THF) insoluble amount of the nitrile group containing acrylic polymer (B1) is preferably 30 wt % or more, more preferably 25 wt % or more, and particularly preferably 20 wt % or more, in order to appropriately dissolve said polymer in the slurry dispersion (hereinbelow, it may be simply referred as "dispersion"). THF insoluble amount is the index of gel amount; and when THF insoluble amount is large, the possibility of existing in a particulate form in the slurry using the organic solvent such as N-methyl pyrrolidone (hereinafter, it may be referred as "NMP"), and the dispersibility in the slurry may be compromised. THF insoluble amount can be controlled by the polymerization reaction temperature, the adding time of the monomer, the polymerization initiator or so, as it will be mentioned in below. Specifically, by the method such as increasing the polymerization reaction temperature, or increasing the polymerization initiator and the chain transfer agent or so, the insoluble amount will be reduced.

The non-aqueous electrolytic solution and the organic solvent which is the slurry dispersing medium have close solubility parameter (SP value), hence when the swelling degree of the polymer against the non-aqueous electrolytic solution used as the positive electrode binder is within appropriate range, in some case, said polymer may not dissolve in the organic solvent as the slurry dispersing medium (that is, the THF insoluble amount is too much); on the other hand, if said polymer easily dissolves to the organic solvent, the swelling degree of the polymer against the non-aqueous electrolytic solution may be out of the appropriate range; however for the present invention, the swelling degree and THF insoluble amount are both preferably in the appropriate range.

The production method of the nitrile group containing acrylic polymer (B1) is not particularly limited, and as mentioned in above, it can be obtained by carrying out the emulsion polymerization of the monomer mixture including the monomers constituting the nitrile group containing acrylic polymer (B1), then carrying out the hydrogenation depending on the needs. As for the method of carrying out the emulsion polymerization, it is not particularly limited, and the conventionally known emulsion polymerization method may be employed. The mixing method of monomer mixture for the emulsion polymerization is not particularly limited, for example the method using the mixing device such as the stirring type, the shaking type, and the rotating type or so may be mentioned. Also, the method using the dispersing kneader such as homogenizer, ball mill, sand mill, roll mill, a planetary kneader such as planetary mixer or so may be mentioned. Also, the method of the hydrogenation is not particularly limited, and known method may be used.

As the polymerization initiator used for the emulsion polymerization, for example, organic peroxides such as sodium persulfate, potassium persulfate, ammonium persulfate, potassium perphosphate, hydrogen peroxides or so; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, benzoyl peroxide, 3,5,5-trimethylhexanoyl peroxide, t-butylperoxy isobutylate or so; azo compounds such as azobisisobutylonitrile, azobis-2,4-dimethylvaleronitrile, azobis cyclohexanecarbonitrile, methyl azobislactate or so may be mentioned.

Among these, the inorganic peroxides are preferably used. These polymerization initiators can be used alone or by combining two or more thereof. Also, the peroxide initiators can be combined with the reducing agent such as sodium bisulfate or so thereby used as redox based polymerization initiator.

The used amount of the polymerization initiator is preferably 0.05 to 5 parts by weight, more preferably 0.1 to 2 parts by weight with respect to the entire amount of 100 parts by weight of monomer mixtures used for the polymerization. By using the polymerization initiator within the above mentioned range, the THF insoluble amount of the obtained nitrile group containing acrylic polymer can be regulated appropriately.

In order to regulate THF insoluble amount of the obtained nitrile group containing acrylic polymer, the chain transfer agent is preferably used during the emulsion polymerization. As the chain transfer agent, for example alkyl mercaptan such as n-hexylmercaptan, n-octylmercaptan, t-octylmercaptan, n-dodecylmercaptan, t-dodecylmercaptan, n-stearylmercaptan or so; xanthogen compounds such as dimethyl xanthogendisulfide, diisopropyl xanthogendisilfide or so; thiuram based compounds such as terpinolen, tetramethylthiuramdisulfide, tetraethylthiuramdisulfide, tetramethylthiurammonosulfide or so; phenol based compounds such as 2,6-di-t-butyl-4-methylphenol, styrene phenol or so; allyl compounds such as allyl alcohol or so; halogenated hydrocarbons such as dichloromethane, dibromomethane, carbon tetrabromide or so; thioglycolic acid, thiomalic acid, 2-ethylhexylthioglycolate, diphenylethylene, α-methylstyrene dimmer or so may be mentioned.

Among these, alkylmercaptan is preferable, and t-dodecylmercaptan is more preferably used. These chain transfer agent may be used alone or by combining two or more thereof.

The used amount of the chain transfer agent is preferably 0.05 to 2 parts by weight, and more preferably 0.1 to 1 parts by weight with respect to 100 parts by weight of the monomer mixture.

During the emulsion polymerization, the surfactant may be used. The surfactant may be any of anionic surfactant, nonionic surfactant, cationic surfactant, amphoteric surfactant. As specific examples of the anionic surfactant, a higher alcohol sulfuric acid ester salts such as sodium laurylsulfate, ammonium laurylsulfate, sodium dodecylsulfate, ammonium dodecylsulfate, sodium octylsulfate, sodium decylsulfate, sodium tetradecylsulfate, sodium hexadecylsulfate, sodium octadecylsulfate or so; alkyl benzene sulfuric acid salt such as sodium dodecyl benzene sulfate, sodium lauryl benzene sulfate, sodium hexadecyl benzene sulfate or so; fatty group sulfuric acid salt such as sodium lauryl sulfate, sodium dodecyl sulfate, sodium tetradecyl sulfate or so may be mentioned.

The used amount of the surfactant is preferably 0.5 to 10 parts by weight, more preferably 1 to 5 parts by weight with respect to 100 parts by weight of the monomer mixtures.

Further, when carrying out the emulsion polymerization, pH modifier such as sodium hydroxide, ammonium or so; various additives such as a dispersant, a chelating agent, an oxygen scavenging agent, a builder, a seed latex for particle size regulation or so can be suitably used. The seed latex refers to the dispersion liquid of the fine particle which is the core of the reaction during the emulsion polymerization. The fine particles have the particle diameter of 100 nm or less in many cases. The fine particles are not particularly limited, and widely used polymer such as acrylic polymer or so are used. According to the seed polymerization, the polymer particle having a relatively uniform particle size can be obtained.

The polymerization temperature during the polymerization reaction is not particularly limited, and usually it is 0 to 100° C., preferably 40 to 80° C. The emulsion polymerization is carried out in such temperature range at the specific polymerization conversion rate, and by adding the polymerization terminator, or by cooling the polymerization or so, the polymerization reaction is terminated. The polymerization conversion rate which terminates the polymerization reaction is preferably 93 wt % or more, and more preferably 95 wt % or more. Also, by setting the polymerization temperature within the above range, THF insoluble amount of the obtained nitrile group containing acrylic polymer can be appropriately regulated.

After terminating the polymerization reaction and also the hydrogenation reaction depending on the needs, if desired, the unreacted monomer is removed, and the pH or the solid concentration is controlled, thereby the nitrile group containing acrylic polymer (B1) is obtained while being dispersed in the dispersing medium (latex). Then, if needed, the dispersing medium may be substituted, and also the dispersing medium is evaporated, then the nitrile group containing acrylic polymer of the particulate form may be obtained in a powder form. As the dispersing medium, it is not particularly limited, as long as the nitrile group containing acrylic polymer (B1) can be uniformly dispersed or dissolved; and specifically those mentioned as the examples in below described fluorine containing polymer (B2) may be mentioned.

In the dispersion liquid (latex) of the nitrile group containing acrylic polymer (B1), a dispersant, a thickening agent, an antioxidant, a defoaming agent, a preservative, an antimicrobial agent, a blister preventing agent, a pH modifier or so which are known may be added depending on the needs.

Also, the weight average molecular weight of the nitrile group containing acrylic polymer (B1) is preferably 100,000 to 2,000,0000, more preferably 750,000 to 1,500,000. By setting the weight average molecular weight of the nitrile group containing acrylic polymer (B1) within the above mentioned range, the dispersibility of the positive electrode active material or so in the positive electrode slurry improves, and the cycle characteristic of the lithium ion secondary battery is excellent. The weight average molecular weight of the nitrile group containing acrylic polymer (B1) can be measured by the method described in the examples.

(B2) the Fluorine Containing Polymer

In the positive electrode binder, the fluorine containing polymer (B2) is used in addition to the above mentioned nitrile group containing acrylic polymer (B1). By including the fluorine containing polymer in the positive electrode binder, the slurry stability is improved, also the swelling of the electrode binder against the non-aqueous electrolytic solution is suppressed, and the cycle characteristic is improved. Further, by the positive electrode binder comprising the fluorine containing polymer in addition to the nitrile group containing acrylic polymer, the cycle characteristic at the high electric potential is improved.

The fluorine containing polymer (B2) is the polymer comprising the fluorine containing monomer unit. The fluorine containing monomer unit is the structural unit formed by polymerizing the fluorine containing monomer. Specifically, the fluorine containing polymer is a homopolymer of the fluorine containing monomer, a copolymer between the fluorine containing monomer and other fluorine containing monomer copolymerizable therewith, a copolymer between the fluorine containing monomer and monomer copolymerizable therewith, and a copolymer between the fluorine containing monomer and other fluorine containing monomer copolymerizable with this and monomer copolymerizable therewith or so may be mentioned.

As the fluorine containing monomer, vinylidene fluoride, tetrafluoroethylene, hexafluoropropylene, vinyl chloride trifluoride, vinyl fluoride, perfluoroalkylvinylether or so may be mentioned, however vinylidene fluoride is preferable.

The ratio of the fluorine containing monomer in the fluorine containing polymer is usually 70 wt % or more, preferably 80 wt % or more. Note that, the upper limit of the ratio of the fluorine containing monomer unit in the fluorine containing polymer is 100 wt %.

As the monomer copolymerizable with the fluorine containing monomer, 1-olefins such as ethylene, propylene, 1-butene or so; aromatic vinyl compounds such as styrene, α-methylstyrene, p-t-butylstyrene, vinyl toluene, chlorostyrene or so; unsaturated nitrile compounds such as (meth)acrylonitrile (abbreviation of acrylonitrile and methacrylonitrile. Same applies to hereinbelow); (meth)acrylate compounds such as methyl(meth)acrylate, butyl (meth)acrylate, 2-ethylhexyl(meth)acrylate or so; (meth)acrylic amide compounds such as (meth)acryl amide, N-methylol(meth) acrylic amide, N-butoxymethyl(meth)acrylic amide or so; carboxyl group containing vinyl compounds such as (meth) acrylic acid, itaconic acid, fumaric acid, crotonic acid, maleic acid or so; epoxy group containing unsaturated compounds such as allylglycidyl ether, glycidyl(meth) acrylic acid or so; amino group containing unsaturated compounds such as dimethylaminoethyl(meth)acrylic acid, diethylaminoethyl(meth)acrylic acid or so; sulfonic acid group containing unsaturated compound such as styrene sulfonic acid, vinyl sulfonic acid, (meth)allyl sulfonic acid or so; sulfuric acid group containing unsaturated compounds such as 3-allyoxy-2-hydroxy propane sulfuric acid or so; phosphate group containing unsaturated compounds such as (meth)acrylic acid-3-chloro-2-propyl phosphate, 3-allyoloxy-2-hydroxy propane phosphate or so may be mentioned.

The ratio of the polymer unit of the fluorine containing monomer and the monomer copolymerizable therewith in fluorine containing polymer (B2) is usually 30 wt % or less and preferably 20 wt % or less.

Among the fluorine containing polymer (B2), the polymer including vinylidene fluoride as the fluorine containing monomer, specifically the homopolymer of the vinylidene fluoride, the copolymer between the vinylidene fluoride and other fluorine containing monomer copolymerizable therewith, and the copolymer between the vinylidene fluoride, and other fluorine containing monomer copolymerizable therewith and other monomer copolymerizable therewith, and the copolymer between vinylidene fluoride and monomer copolymerizable therewith are preferable.

Among the above mentioned fluorine containing polymer, homopolymer of vinylidene fluoride (polyvinylidene fluoride), vinylidene fluoride-hexafluoropropylene copolymer, and polyvinyl fluoride are preferable, and more preferably it is polyvinylidene fluoride.

Fluorine containing polymer (B2) may be one type only or it may be two or more type used together. Particularly, it is preferable to use the low molecular weight compound and the high molecular weight compound together. Specifically, those having less than 35 kpoise of a melt viscosity of the fluorine containing polymer measured by ASTM D3835/ 232° C. 100 sec$^{-1}$ is defined as the low molecular weight, and those having 35 kpoise or more is defined as high molecular weight, and it is preferable to use both together.

For example, as polyvinylidene fluoride of high molecular weight, KYNAR HSV900 made by ARKEMA Chemistry; Solef6020, Solef6010, Solef5130 made by SOLVAY; and KF7208 made by KUREHA CORPORATION or so may be mentioned. Also, as polyvinylidene fluoride of the low molecular weight, for example KYNAR710 720 740 760 760A made by ARKEMA Chemistry; Solef6008 made by SOLVAY; and KF1120 made by KUREHA CORPORATION or so may be mentioned.

When the high molecular weight compound and low molecular weight compound are combined as fluorine containing polymer (B2), the weight ratio (the low molecular weight compound/the high molecular weight compound) of the low molecular weight compound and the high molecular weight compound of the fluorine containing polymer is preferably 30/70 to 70/30.

By using the low molecular weight compound and the high molecular weight compound within said range, the binding property of the positive electrode active materials against each other, the binding property between the current collector and the positive electrode active material, and the uniformity of the positive electrode slurry can be effectively maintained.

Also, the fluorine containing polymer (B2) has the melt viscosity measured at the temperature of 232° C., a shear speed of 100 sec$^{-1}$ of preferably 10 to 100 kpoise, and more preferably 30 to 80 kpoise. By setting the melt viscosity of the fluorine containing polymer (B2) within the above mentioned range, the high concentration of the slurry and the binding property of the positive electrode can be both attained, thus the cell having excellent cycle characteristic can be produced.

Note that, the melt viscosity of the fluorine containing polymer (B2) is the value measured under the condition of the temperature of 232° C. and the shear speed of 100 sec$^{-1}$ in accordance with ASTM D3835. This is the viscosity when predetermined shear speed is applied while the fluorine containing polymer is in melting state, and it uses different measuring device and measuring condition (measuring temperature and the shear speed) from the viscosity of the slurry for the lithium ion secondary battery positive electrode which is described in the following.

The weight average molecular weight in terms of the polystyrene conversion by gel-permeation chromatography of the fluorine containing polymer (B2) is preferably 100,000 to 2,000,000; more preferably 200,000 to 1,500,000; and particularly preferably 400,000 to 1,000,000.

By setting the weight average molecular weight of the fluorine containing polymer (B2) within the above mentioned range, the positive electrode active material (A) and the conductive material (C) in the positive electrode active material can be suppressed, and also the viscosity regulation of the positive electrode slurry becomes easy.

The glass transition temperature (Tg) of the fluorine containing polymer (B2) is preferably 0° C. or less, more preferably −20° C. or less, and particularly preferably −30° C. or less. The lower limit of Tg of the fluorine containing polymer (B2) is not particularly limited, and preferably it is −50° C. or higher, and more preferably −40° C. or higher. When Tg of the fluorine containing polymer (B2) is within the above mentioned range, the falling off (powder fall off) of the positive electrode active material and the conductive material in the positive electrode active material layer can be suppressed. Also, Tg of the fluorine containing polymer (B2) can be regulated by combining various monomers. Note that, Tg can be measured using the differential scanning calorimeter based on JIS K 7121; 1987.

The melting point (Tm) of the fluorine containing polymer (B2) is preferably 190° C. or less, more preferably 150 to 180° C., and further preferably 160 to 170° C. When Tm of the fluorine containing polymer (B2) is within the above mentioned range, the positive electrode having excellent flexibility and the adhesive strength can be made. Also, Tm of the fluorine containing polymer (B2) can be regulated by combining various monomers or by controlling the polymerization temperature. Note that, Tm can be measured by using the differential scanning calorimeter based on JIS K 7121; 1987.

As the production method of the fluorine containing polymer (B2), it is not particularly limited, and any method of a solution polymerization method, a suspension polymerization method, a bulk polymerization method, and an emulsion polymerization method or so can be used. Among these, the suspension polymerization method and emulsion polymerization method are preferable. By producing the fluorine containing polymer (B2) by the emulsion polymerization method, the productivity of the fluorine containing polymer (B2) can be improved, and also the fluorine containing polymer (B2) comprising the desired average particle diameter can be obtained. As for the polymerization reaction, any of an ionic polymerization, a radical polymerization, a living radical polymerization, or so can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

The fluorine containing polymer (B2) is used as the dispersion which is dispersed in the dispersing medium or as the solution being dissolved. As the dispersing medium, it is not particularly limited as long as the fluorine containing polymer (B2) can be dispersed or dissolved uniformly, and the water or organic solvent or so can be used. As the organic solvent, cyclic aliphatic hydrocarbons such as cyclopentane and cyclohexane or so; aromatic hydrocarbons such as toluene, xylene and ethylbenzene or so; ketones such as acetone, ethylmethyl ketone, diisopropyl ketone, cyclohexanone, methylcyclohexane, ethylcyclohexane or so; chlorine based aliphatic hydrocarbons such as methylene chloride, chloroform, and carbon tetrachloride or so; esters such as ethyl acetate, butyl acetate, γ-butyrolactone, ε-caprolactone or so; alkylnitriles such as acetonitrile, propionitrile or so; ethers such as tetrahydrofurane, ethyleneglycoldiethylether or so; alcohols such as methanol, ethanol, isopropanol, ethyleneglycol, ethyleneglycolmonomethylether or so; amides such as N-methylpyrrolidone, and N,N-dimethylformamide or so may be mentioned.

As these dispersing medium, only one type may be used, or two or more type of dispersing mediums may be mixed for use as the mixed solvent. Among these, particularly, water, or N-methylpyrrolidone, cyclohexanone or toluene or so are preferable, since it is industrially used during the positive electrode slurry production, and also it barely evaporates during the production, consequently the evaporation of the positive electrode slurry is suppressed hence the obtained positive electrode has enhanced smoothness.

When the fluorine containing polymer (B2) is dispersed in the dispersing medium in a particulate form, the solid concentration of the dispersion including the fluorine containing polymer is usually 1 to 25 wt %, preferably 3 to 20 wt %, and more preferably 5 to 15 wt % from the point of the handling property.

Also, the viscosity when the fluorine containing polymer (B2) is dissolved in N-methylpyrrolidone to form 8% solution is preferably 10 to 5000 mPa·s, and more preferably 100 to 2000 mPa·s. By setting the viscosity of NMP solution of 8 wt % fluorine containing polymer (B2) within said range, it becomes easy to regulate the viscosity so that the positive electrode slurry is easily coated during the production of the positive electrode slurry. The viscosity of NMP solution of 8 wt % fluorine containing polymer (B2) can be measured by dissolving the fluorine containing polymer (B2) in NMP to form 8% solution, then to this, by using B type viscometer (RB-80L made by TOKI SANGYO CO., LTD.) at 25° C. and 60 rpm based on JIS K 7117; 1999.

The positive electrode binder includes the above mentioned nitrile group containing acrylic polymer (B1) and the fluorine containing polymer (B2). By the positive electrode binder including the nitrile group containing acrylic polymer (B1) and the fluorine containing polymer (B2), the positive electrode having excellent bending property of the jelly roll, and the lithium ion secondary battery having excellent initial capacity, output characteristic and high electrical potential can be obtained. The ratio of the nitrile group containing acrylic polymer (B1) with respect to 100 wt % of the total amount of the positive electrode binder is preferably 5 to 50 wt %, more preferably 5 to 40 wt %, and particularly preferably 5 to 30 wt %. By including said nitrile group containing acrylic polymer in said ratio, the lithium ion secondary battery having high electrical potential cycle characteristic and high capacity can be obtained without increasing the internal resistance or lowering the initial capacity.

The ratio of the fluorine containing polymer (B2) with respect to 100 wt % of total amount of the positive electrode binder is preferably 50 to 95 wt %, more preferably 60 to 90 wt %, and further preferably 70 to 85 wt %.

The positive electrode binder may include, depending on the needs, other polymer which can be used as the binder, in addition to the above mentioned nitrile group containing acrylic polymer (B1) and the fluorine containing polymer (B2). As other polymer which can be used together, for example, resins such as polyacrylic acid derivative, polyacrylonitrile derivative or so; soft polymers such as acrylic based soft polymer, diene based soft polymer, olefin based soft polymer, vinyl based soft polymer or so can be used. Only one type of these may be used, or two or more types can be used together. Said other polymer may be included in a ratio of 30 wt % or less, more preferably 0.1 to 20 wt %, and particularly preferably 0.2 to 10 wt % with respect to 100 wt % of total amount of the positive electrode binder.

The amount of the positive electrode binder is preferably 0.8 to 3 parts by weight, more preferably 1 to 2 parts by weight, and particularly preferably 1.5 to 2 parts by weight with respect to 100 parts by weight of the positive electrode active material. When the amount of the positive electrode binder is within said range, the adhesiveness between the obtained positive electrode active material layer and the current collector can be secured sufficiently, and the capacity of the lithium ion secondary battery can be made high and the internal resistance can be made low.

(C) The Conductive Material

The positive electrode slurry comprises the conductive material. The particle diameter of the conductive material is, in terms of number average particle diameter, preferably 5 to 40 nm, more preferably 10 to 38 nm, and particularly preferably 15 to 36 nm. If the particle diameter of the conductive material in the positive electrode is too small, aggregation tends to occur easily and the uniform dispersion becomes difficult, and as a result, the internal resistance of the positive electrode increases and the improvement of the capacity tend to become difficult. However, by using the aforementioned positive electrode binder, it is possible to disperse uniformly even for the fine particle conductive material, and the capacity can be improved. Also, if the particle diameter of the conductive material is too large, it becomes difficult to exist between the positive electrode active materials, and the internal resistance of the positive electrode increases, thus it becomes difficult to improve the capacity. The conductive material is ultrasonically dispersed by 0.01 wt % in the water, then it is measured using the dynamic light scattering particle size-particle size distribution measuring device (for example, the particle size distribution measuring device Nanotrac Wave-EX 150 made by NIKKISO CO., LTD), thereby the number average particle diameter of the conductive material can be obtained.

Also, the specific surface area (BET type) of the conductive material is preferably 40 to 1000 $m^2/g$, more preferably 50 to 900 $m^2/g$, and particularly preferably 50 to 300 $m^2/g$. If the specific surface area of the conductive material is too large, the aggregation occurs easily and the uniform dispersion becomes difficult, and as a result the internal resistance of the positive electrode increases thus the improvement of the capacity becomes difficult. Note that, as the conductive material, only one type of the conductive material having the above mentioned specific surface area may be used, or the conductive material having two or more types of different specific surface area may be combined for use so that the BET specific surface area of the conductive material after the mixing is within the aforementioned range.

As the conductive material, as similar to the negative electrode, conductive carbons such as acetylene black, Ketjen black, carbon black, graphite, vapor-grown carbon fiber and carbon nanotube or so can be used. By comprising the conductive material, the stability during the production of the positive electrode slurry improves, also the electrical connection of the positive electrode active materials against each other in the positive electrode active material layer can be improved, and the high capacity is attained. The content of the conductive material is preferably 1 to 3 parts by weight, more preferably 1.2 to 2.8 parts by weight, and particularly preferably 1.5 to 2.5 parts by weight with respect to 100 parts by weight of the positive electrode active material. If the content of the conductive material is too little, the internal resistance in the positive electrode increases, and in some case, it may be difficult to attain high capacity. Also, if the content of the conductive material is too much, it becomes difficult to attain highly densified positive electrode, and in some case the initial capacity may decline.

Other Components

Also, in the positive electrode slurry, as the arbitrary component, other components such as a reinforcing material, a leveling agent, electrolytic solution additives which has function to suppress the electrolytic solution decomposition or so may be included.

As a reinforcing material, a variety of inorganic and organic fillers having spherical shape, plate shape, rod shape or fibrous shape can be used. By using the reinforcing material, the positive electrode which is strong and flexible can be obtained, and an excellent long term cycle characteristic can be exhibited. The content of the reinforcing material is usually 0.01 to 20 parts by weight, and preferably 1 to 10 parts by weight with respect to 100 parts by weight of the positive electrode active material. By having the reinforcing material within the above mentioned range, the high capacity and the high load characteristic can be exhibited.

As the leveling agent, the surfactants such as the alkyl based surfactant, the silicone based surfactant, the fluorine based surfactant, and the metal based surfactant or so may be mentioned. By mixing the leveling agent, the repelling during the coating can be prevented, and the smoothness of the positive electrode can be improved. The content of the leveling agent is preferably 0.01 to 10 parts by weight with respect to 100 parts by weight of the positive electrode active material. By having the content of the leveling agent within above mentioned range, the productivity of the positive electrode production, the smoothness and the battery characteristic becomes excellent.

As the electrolytic solution additive, vinylene carbonate or so which is used in the electrolytic solution can be used. The content of the electrolytic solution additive is preferably 0.01 to 10 parts by weight with respect to 100 parts by weight of the total amount of the positive electrode active material. When the content of the electrolytic solution additive is within the above mentioned range, the cycle characteristic and the high temperature characteristic become excellent. As other additives, nano particles such as fumed silica or fumed alumina or so may be mentioned. By mixing such nano particles, thixotropy of the positive electrode slurry can be controlled, and thereby the obtained positive electrode can enhance the leveling property. The content of the nano particles is preferably 0.01 to 10 parts by weight with respect to 100 parts by weight of the total amount of the positive electrode active material. When the ratio of the nano particles with respect to the positive electrode is within the above mentioned range, the slurry stability and the productivity are excellent and the high battery characteristic are exhibited.

As the viscosity thickener, for example, as cellulose polymer, cellulose compounds (including ammonium salts and alkaline metal salts or so) such as carboxymethyl cellulose, carboxyethyl cellulose, carboxyethylmethyl cellulose, ethyl cellulose, hydroxylmethyl cellulose, hydroxyethyl cellulose, hydroxypropyl cellulose, hydroxyethylmethyl cellulose or so; oxide starch, phosphate starch, casein, various modified starch, polyethylene oxide, polyethylene glycol, polyvinyl alcohol, polyvinylpyrrolidone, polysulfonic acid, polycarboxylic acid, acrylic acid or methacrylic acid copolymer (including salts such as ammonium slats or alkaline metal salts (sodium salts or lithium salts) or so), polyacrylonitrile or so may be mentioned. These may be used by combining two or more types.

The content of the viscosity thickener is preferably 0.5 to 1.5 parts by weight with respect to 100 parts by weight of the positive electrode active material. If the content of the viscosity thickener is within the above range, the coating property of the positive electrode slurry is improved, and the adhesiveness between the positive electrode active material layer and the current collector is enhanced.

The Production Method of the Slurry for the Lithium Ion Secondary Battery Positive Electrode The method of producing the slurry for the lithium ion secondary battery positive electrode is not particularly limited as long as the desired viscosity can be obtained by mixing the above mentioned positive electrode active material (A), the positive electrode binder (B), the conductive material (C) and other additives in the organic solvent, however it preferably includes the following steps.

Step (1): a step of obtaining the thick paste having a solid concentration of 77 to 90 wt % by kneading the positive electrode (A), the nitrile group containing acrylic polymer (B1), the fluorine containing polymer (B2) and the conductive material (C) in the organic solvent at 350 to 1000 W/kg for 15 to 120 minutes; and Step (2): a step of obtaining a dispersion having the solid concentration of 70 to 76 wt % by diluting said thick paste by the organic solvent.

During the steps of producing the positive electrode slurry, by including the above mentioned step (1) and step (2), the dispersibility of each component of the positive electrode active materials or so improves, and the positive electrode having excellent smoothness can be obtained. As a result, the cycle characteristic of the lithium ion secondary battery improves. Also, by including the above mentioned step (1) and step (2), the viscosity (the viscosity at the shear speed of 2 $\sec^{-1}$ or the viscosity at the shear speed of 20 $\sec^{-1}$) of the positive electrode slurry which is described in the following can be easily regulated to be in the predetermined range.

(Step of Obtaining the Thick Paste Having the Solid Concentration of 77 to 90 Wt % (Step 1))

In the production method of the slurry for the lithium ion secondary battery positive electrode of the present invention, first the positive electrode active material (A), the nitrile group containing acrylic polymer (B1), the fluorine containing polymer (B2) and the conductive material (C) are kneaded at 350 to 1000 W/kg for 15 to 120 minutes thereby the thick paste having the solid concentration of 77 to 90 wt % is obtained.

As for the positive electrode active material (A), the nitrile group containing acrylic polymer (B1), the fluorine containing polymer (B2) and the conductive material (C) used in the production method of the positive electrode slurry of the present invention, those described in the positive electrode slurry may be mentioned.

Also, as the arbitrary component added besides the above mentioned components, those described in the positive electrode slurry may be mentioned. The arbitrary component may be added in step (1) or in step (2).

As the organic solvent, cyclic aliphatic hydrocarbons such as cyclopentane and cyclohexane or so; aromatic hydrocarbons such as toluene, xylene and ethylbenzene or so; ketones such as acetone, ethylmethyl ketone, diisopropyl ketone, cyclohexanone, methylcyclohexanone, ethylcyclohexanone or so; chlorine based aliphatic hydrocarbons such as methylene chloride, chloroform, and carbon tetrachloride or so; esters such as ethyl acetate, butyl acetate, γ-butyrolactone, ε-caprolactone or so; alkylnitriles such as acetonitrile, propionitrile or so; ethers such as tetrahydrofurane, ethyleneglycoldiethylether or so; alcohols such as methanol, ethanol, isopropanol, ethyleneglycol, ethyleneglycolmonomethylether or so; amides such as N-methylpyrrolidone, and N,N-dimethylformamide or so may be mentioned.

As these organic solvents, only one type may be used, or two or more type of mixed solvent may be mixed for use. Also, it may be mixed with water. Among these, the dispersing medium having excellent dispersibility of the positive electrode active material (A), the low boiling point and the high volatility is preferable since it can be removed in short period of time and at low temperature. Specifically, acetone, toluene, cyclohexanone, cyclopentane, tetrahydrofurane, cyclohexane, xylene or N-methylpyrrolidone, or the mixture solvent thereof, or the mixture solvent thereof with water is preferable.

As the kneader used for the kneading, the kneader which can provide high shearing is preferable. Specifically, a ball mill, a beads mill, a sand mill, an ultrasonic disperser, or a planetary mixer, a kneader, a homogenizer, an ultrasonic homogenizer, or a blade type stirrer such as disperser or so may be mentioned; however among these, planetary mixer is preferable.

The positive electrode active material (A) and the conductive material (C) may be added to the kneader separately in a predetermined amount, or those may be added to the kneader after mixing predetermined amount of these in advance.

The nitrile group containing acrylic polymer (B1) and the fluorine containing polymer (B2) may be added each separately to the kneader in a predetermined amount; or these may be added to the kneader after mixing predetermined amount of these in advance. Also, the nitrile group containing acrylic polymer (B1) and the fluorine containing polymer (B2) may be added to the kneader in a powder form, or may be added to the kneader in a solution form which is dissolved in the organic solvent.

The organic solvent may be added to the kneader before the kneading in an amount which satisfies the desired solid concentration, or it may be added in a small amount before the kneading and then added so that it satisfies desired solid concentration while kneading.

In the step (1), the shear during the solid kneading is preferably 350 to 1,000 W/kg, more preferably 500 to 750 W/kg. Also, the stirring time of the solid kneading is preferably 15 to 120 minutes, more preferably 20 to 90 minutes. By setting the shear and the time of the solid kneading as described in the above, the smoothness of the positive electrode can be improved.

The rotational speed of stirring blade when using the planetary mixer as the kneader is not particularly limited, but preferably it is 10 rpm or more, more preferably 15 rpm or more; and preferably 100 rpm or less and more preferably 80 rpm or less. By setting the rotational speed of the stirring blade when using the planetary mixer as the kneader to 10 rpm or more, the shear can be applied efficiently to the paste, and as a result, the smoothness and the battery characteristic of the obtained positive electrode can be improved. By setting the rotational speed of the planetary mixer to 100 rpm or less, the excessive dispersing of the paste can be prevented, hence the smoothness and the battery characteristic of the obtained positive electrode can be improved.

The solid concentration of the thick paste in the step (1) is preferably 77 to 90 wt %, and more preferably 79 to 87 wt %. By setting the solid concentration within the above mentioned range, the shear can be applied efficiently to the thick paste, and as a result, the smoothness and the battery characteristic of the obtained positive electrode can be improved.

(The Step of Diluting the Thick Paste with Organic Solvent (Step (2))

In the production method of the slurry for the lithium ion secondary battery positive electrode of the present invention, the dispersion having the solid concentration of 70 to 76 wt % is obtained by diluting said thick paste with organic solvent.

In the step (2), the mixing may be carried out after adding predetermined amount of the organic solvent is added to said thick paste; or the organic solvent may be added continuously while mixing said thick paste.

As the kneader, the kneader used in step (1) can be used.

In the step (2), the rotational speed of the stirring blade when using the planetary mixer as the kneader is not particularly limited, but preferably it is 10 rpm or more, more preferably 15 rpm or more; and preferably 100 rpm or less and more preferably 80 rpm or less.

The kneading time of the step (2) may be the time needed for the paste to be uniformly dispersed by sufficiently diluting the thick paste with the organic solvent, and preferably it is 10 to 120 minutes.

The solid concentration of the dispersion in the step (2) is preferably 70 to 76 wt %, more preferably 72 to 76 wt %. By setting the solid concentration of the dispersion within the above mentioned range, the dispersibility of each component such as the positive electrode active material and the conductive material are improved, and the positive electrode having excellent smoothness can be obtained.

The positive electrode slurry of the present invention has the viscosity at the shear speed of 2 $sec^{-1}$ measured by a coaxial cylinder type viscometer is preferably 1,000 to 20,000 mPa·s, and more preferably 2,400 to 13,300 mPa·s. Also, the positive electrode slurry of the present invention has the viscosity at the shear speed of 20 $sec^{-1}$ measured by a coaxial cylinder type viscometer is preferably 1,000 to 8,000 mPa·s, and more preferably 2,000 to 7,000 mPa·s. The viscosity of the above positive electrode slurry can be measured by the method described in the below example.

Also, a ratio between the viscosity at a shear speed of 2 $sec^{-1}$ and the viscosity at the shear speed of 20 $sec^{-1}$ ((the viscosity at a shear speed of 2 $sec^{-1}$)/(the viscosity at the shear speed of 20 $sec^{-1}$)) is 1.0 to 2.5, preferably 1.1 to 2.0, and more preferably 1.2 to 1.9.

By setting the ratio of the viscosity within the above range, the difference between the viscosities due to the shear speed can be made small, thus the thixotrophy of the slurry can be controlled. As a result, the coated amount of the positive electrode slurry when producing the positive electrode, that is the target accuracy can be stabilized and the smooth positive electrode can be produced. Also, the viscosity change over the time can be suppressed, that is since the thixotrophy can be provided, the storage stability of the slurry is improved, and also the dripping of the coated slurry on the current collector can be prevented.

The Lithium Ion Secondary Battery Positive Electrode

The lithium ion secondary battery positive electrode is made by coating and drying the above mentioned slurry for the lithium ion secondary battery positive electrode on the current collector.

The production method of the lithium ion secondary battery positive electrode includes the step of coating and drying the positive electrode slurry on one side or both sides of the current collector thereby forming the positive electrode active material layer.

The method for coating the electrode slurry onto the current collector is not particularly limited. For example, a doctor blade method, a dip method, a reverse roll method, a direct roll method, a gravure method, an extrusion method, a brush method or so may be mentioned.

As the drying method, for example, drying by warm air, hot air or low wet air, vacuum drying, drying method by irradiation of (far-) infrared rays, electron beam or so may be mentioned. The drying time is usually 5 to 30 minutes, and the drying temperature is usually 40 to 180° C.

When producing the lithium ion secondary battery positive electrode, it is preferable to comprise the step of lowering the porosity of the positive electrode active material layer by a pressure applying treatment using the metal press or roll press or so. The porosity of the positive electrode active material layer is preferably 5 to 30%, and more preferably 7 to 20%. If the porosity of the positive electrode active material layer is too high, the charging efficiency or the discharging efficiency may deteriorate in some case. On the other hand, if the porosity of the positive electrode active material layer is too low, the high volume capacity becomes difficult to obtain, and the positive electrode active material layer easily falls off from the current collector hence the malfunction may easily occur in some case. Further, in case of using the curable polymer as the positive electrode binder, it is preferable to cure.

The thickness of the positive electrode active material layer is, normally 5 to 300 μm, preferably 30 to 250 μm. By having the thickness of the positive electrode active material layer within the above mentioned range, the lithium ion secondary battery having high load characteristic and cycle characteristic can be obtained.

The content ratio of the positive electrode active material in the positive electrode active material is preferably 85 to 99 wt %, and more preferably 88 to 97 wt %. By having the content ratio of the positive electrode active material layer in the positive electrode active material layer within the above mentioned range, the lithium ion secondary battery showing high capacity and also the flexibility and the binding property can be obtained.

The density of the positive electrode active material layer is preferably 3.0 to 4.0 g/cm$^3$, and more preferably 3.4 to 4.0 g/cm$^3$. By having the density of the positive electrode active material layer within the above mentioned range, the lithium ion secondary battery having high capacity can be obtained.

The current collector is not particularly limited as long as it is a material having electric conductivity and electrochemical durability, but the metal material having heat resistance is preferable; and for example, iron, copper, aluminum, nickel, stainless steel, titanium, tantalum, gold and platinum or so may be mentioned. Among these, aluminum is particularly preferable as the current collector used for the positive electrode of the lithium ion secondary battery. The shape of the current collector is not particularly limited, and the sheet shaped collector having a thickness of about 0.001 to 0.5 mm or so is preferable. The current collector may be used by carrying out the roughening treatment in advance in order to increase the adhesive strength of the electrode active material layer. Method of the roughening treatment may include mechanical polishing, electropolishing, chemical polishing or so. As the mechanical polishing, the coated abrasive having fixed abrasive particles, the grinding stone, the emery buff, the wire-brush provided with steel wire and or so can be used. Also, a primer layer may be formed on the surface of the current collector to increase the adhering strength and conductivity of the electrode active material layer.

The Lithium Ion Secondary Battery

The lithium ion secondary battery according to the present invention comprises the above mentioned lithium ion secondary battery positive electrode, the following described negative electrode and non-aqueous electrolytic solution, and usually includes separator as well.

The negative electrode comprises the current collector, and the negative electrode active material layer stacked on said current collector.

The negative electrode active material layer comprises the negative electrode active material (a), and usually comprises the negative electrode binder (b) and the conductive material (c) or so.

(a) The Negative Electrode Active Material

The negative electrode active material is the substance which can provide and receive the electron (lithium ion) in the negative electrode. As the negative electrode active material, preferably the alloy based active material (a1) is used, and also the carbon based active material (a2) can be used depending on the needs. The negative electrode active material preferably includes the alloy based active material and the carbon based active material. By using both the alloy based active material and the carbon based active material, the battery having larger capacity than the negative electrode using only the alloy based active material, and the problems such as the decline of the adhesive strength of the negative electrode, and the decline of the cycle characteristic can be solved.

(a1) The Alloy Based Active Material

The alloy based active material is the active material which includes the element capable of inserting the lithium, and has the theoretical electric capacity per weight of inserted is 500 mAh/g or more (the upper limit of said theoretical electric capacity is not particularly limited, however for example 5000 mAh/g or less) when lithium. Specifically, a single metal which forms the lithium alloy and the alloy thereof, and oxides, sulfides, nitrides, silicides, carbides and phosphides thereof may be used.

As a single metal which forms the lithium alloy and the alloy thereof, metal such as Ag, Al, Ba, Bi, Cu, Ga, Ge, In, Ni, P, Pb, Sb, Si, Sn, Sr, Zn or so and the compound comprising said metals may be mentioned. Among these, single metal of silicon (Si), tin (Sn) or lead (Pb), or the alloy including these atoms, or the compound of these metals are preferable. Further, among these, single metal of Si capable of inserting and releasing lithium at low electrical potential is more preferable.

The alloy based active material may further comprise one or more of non-metal element. Specifically, for example, SiC, $SiO_xC_y$ (hereinafter, it will be referred as "SiOC") ($0<x\leq3$, $0<y\leq5$), $Si_3N_4$, $Si_2N_2O$, $SiO_x$ (x=0.01 or more and less than 2), $SnO_x$ ($0<x\leq2$), LiSiO, LiSnO or so may be mentioned. Among these, SiOC, $SiO_x$, and SiC which are capable of inserting and releasing lithium at low electrical potential are more preferable. For example, SiOC can be obtained by firing the polymer material which includes silicon. Among SiOC, those having the range of $0.8\leq x\leq3$ and $2\leq y\leq5$ are preferable, from the point of the capacity and the cycle characteristic.

As oxides, sulfides, nitrides, silicides, carbides and phosphides of a single metal which forms the lithium alloy and the alloy thereof; oxides, sulfides, nitrides, silicides, carbides and phosphides of element capable of inserting and releasing lithium are mentioned, and among these oxides are particularly preferable. Specifically, tin oxide, manganese oxide, titanium oxide, niobium oxide, vanadium oxide; and a lithium containing composite oxide including the metal element selected from the group consisting of Si, Sn, Pb, and Ti atom are preferable.

As the lithium containing composite oxide, lithium titanium composite oxides shown by $Li_xTi_yM_zO_4$ ($0.7\leq x\leq1.5$, $1.5\leq y\leq2.3$, and $0\leq z\leq1.6$; and M is Na, K, Co, Al, Fe, Ti, Mg, Cr, Ga, Cu, Zn, and Nb) is further mentioned, and among these $Li_{4/3}Ti_{5/3}O_4$, $Li_1Ti_2O_4$, $Li_{4/5}Ti_{11/5}O_4$ are preferable.

Among these alloy based active material, the active material including silicon is preferable. By using the active material including the silicon, the electric capacity of the lithium ion secondary battery can be enlarged. Further, among the active material including the silicon, $SiO_xC_y$, $SiO_x$, and SiC are more preferable. For the active material including the combination of silicon and carbon, the effect of the present invention can be obtained easier, since insertion and releasing of Li to Si (silicon) at high electrical potential and to C (carbon) at low electrical potential is expected to occur, thus the expansion and contraction is suppressed more than the other alloy based active material.

The alloy based active material is preferably prepared in particulate form. When the shape of the particle is spherical, the negative electrode having higher density can be formed during the negative electrode forming. In case the alloy based active material is particle, the volume average particle diameter thereof is preferably 0.1 to 50 μm, more preferably 0.5 to 20 μm, and particularly preferably 1 to 10 μm. When the volume average particle diameter of the alloy based active material is within this range, the production of the slurry which is used for the production of the negative electrode becomes easy. Note that, the volume average particle diameter in the present invention can be obtained by measuring the particle diameter distribution by laser diffraction.

A tap density of the alloy based active material is not particularly limited, but those with 0.6 $g/cm^3$ or higher is preferably used.

The specific surface area (BET type) of the alloy based active material is preferably 3.0 to 20.0 $m^2/g$, more preferably 3.5 to 15.0 $m^2/g$, and particularly preferably 4.0 to 10.0 $m^2/g$. By having the specific surface area of the alloy based active material within the above mentioned range, the active site of the alloy based active material surface increases, thus the lithium ion secondary battery will have excellent output characteristic. Note that, in the present invention, "BET specific surface area" is that by the nitrogen absorption method, and it is the value measured in accordance with ASTM D3037-81.

(a2) The Carbon Based Active Material

The carbon based active material is the active material having the main backbone capable of inserting lithium, and specifically the carbon material and graphite material may be mentioned. The carbon material is that of with low graphitization degree (that is, low crystallinity) wherein in general the carbon precursor is carbonized by carrying out the heat treatment at 2000° C. or less. The lower limit of the temperature of said heat treatment is not particularly limited, and for example it can be 500° C. or higher. The graphite material is that having high crystallinity which is close to the graphite obtained by carrying out the heat treatment of 2000° C. or higher to the graphitizable carbon. The upper limit of said treatment temperature is not particularly limited, but for example it can be 5000° C. or less.

As the carbon material, for example the graphitizable carbon which can easily change the structure of carbon by heat treatment temperature, or non-graphitizable carbon which has structure having close amorphous structure represented by glass form carbon or so may be mentioned.

As the graphitizable carbon, the carbon material having a tar pitch obtained from petroleum or coal or so as the source material may be mentioned. As specific examples, cokes, mesocarbon microbeads (MCMB), mesophase pitch carbon fiber, thermolysis vapor grown carbon fiber or so may be mentioned. MCMB is a carbon fine particle obtained by isolating and extracting the mesophase spherule which is generated during the heating of pitches at 400° C. or so. Mesophase pitch carbon fiber is a carbon fiber having the mesophase pitch obtained by growing and combining said mesophase spherule as the source material. The thermolysis vapor grown carbon fiber is a carbon fiber obtained by, (1) the method of thermolysing the acrylic polymer fiber or so, (2) the method of thermolysing the pitch by spinning, (3) the method of catalyst vapor deposition method (catalyst CVD) which vapor thermolyses the hydrocarbon using the catalyst of nano particles such as iron or so.

As the non-graphitizable carbon, phenol resin fired body, polyacrylonitrile carbon fiber, quaji-isotropic carbon, furfuryl alcohol resin fired body (PFA), and hard carbon or so may be mentioned.

As the graphite material, natural graphite, artificial graphite or so may be mentioned. As the artificial graphite, mainly the artificial graphite heat treated at 2800° C. or higher, graphitized MCMB heat treating MCMB at 2000° C. or higher, the graphitized mesophase pitch carbon fiber heat treating the mesophase pitch based carbon fiber at 2000° C. or higher or so may be mentioned.

Among the carbon material of above mentioned, graphite material is preferable. By using the graphite material, it becomes easy to increase the density of the negative electrode active material, and it becomes easy to produce the negative electrode having the density of the negative electrode active material layer of 1.6 g/cm$^3$ or more (the upper limit of said density is not particularly limited, however it can be 2.2 g/cm$^3$ or less). The negative electrode comprising the negative electrode active material layer having the negative electrode active material layer density within said range can exhibit significantly effect of the present invention.

The carbon based active material is preferably those which are made into particulate form. When the shape of the particle is spherical, the negative electrode having higher density can be formed during the negative electrode forming. In case the carbon based active material is particle, the volume average particle diameter of the carbon based active material is preferably 0.1 to 100 μm, more preferably 0.5 to 50 μm, and particularly preferably 1 to 30 μm. When the volume average particle diameter of the carbon based active material is within this range, the production of the slurry (the negative electrode slurry) used for the production of the negative electrode becomes easy.

The tap density of the carbon based active material is not particularly limited; however those having 0.6 g/cm$^3$ or more are preferably used.

The specific surface area of the carbon based active material is preferably 3.0 to 20.0 m$^2$/g, more preferably 3.5 to 15.0 m$^2$/g, and particularly preferably 4.0 to 10.0 m$^2$/g. When the specific surface area of the carbon based active material is within the above mentioned range, the active site of the carbon based active material surface increases, hence the output characteristic of the lithium ion secondary battery becomes excellent. The specific surface area is measured by for example BET method.

The negative electrode active material may use only one type of the alloy based active material, or by combining two or more types in an arbitrary ratio. Also, as the preferable embodiment of the negative electrode active material, the active material combining the alloy based active material and the carbon based active material can be mentioned. In case of using the alloy based active material (a1) and the carbon based active material (a2) together as the negative electrode active material (a), the mixing method thereof is not particularly limited, and conventionally known dry mixing or wet mixing may be mentioned.

In case of using the alloy based active material (a1) and the carbon based active material (a2) together as the negative electrode active material (a), it is preferable to comprise 1 to 50 parts by weight of the alloy based active material (a1) with respect to 100 parts by weight of the carbon based active material (a2). By mixing the alloy based active material and the carbon based active material within the above mentioned range, the battery having larger capacity than the negative electrode obtained by only using the conventional carbon based active material can be obtained. Further, the decline of the adhesive strength of the negative electrode or the decline of the cycle characteristic can be prevented. As long as it is the negative electrode comprising the negative electrode active material layer using the alloy based active material (a1) and the carbon based active material (a2) together, the effect of the present invention will be prominent.

(b) The Negative Electrode Binder

The negative electrode binder is the component which binds the negative electrode active material of the negative electrode to the surface of the current collector, and has excellent property of holding the negative electrode active material, and further that having high adhesiveness to the current collector is preferably used. Usually, as the material of the binder, a polymer is used. The polymer as the material of the binder may be homopolymer or copolymer. As the polymer of the negative electrode binder, it is not particularly limited, and for example the polymer compound such as fluorine polymer, diene polymer, acrylate polymer, polyimide, polyamide, polyurethane or so may be mentioned. Among these, fluorine polymer, diene polymer or acrylic polymer is preferable; and more preferably it is diene polymer or acrylic polymer since the electric voltage resistance can be made high and the energy density of the lithium ion secondary battery can be made high; and particularly preferably it is diene polymer since the electrode strength can be improved.

The diene polymer is the polymer including the structural unit formed by polymerizing the conjugated monomer (hereinafter, it may be referred as "conjugated diene monomer unit"), and specifically a homopolymer of the conjugated diene monomer; copolymer of different types of conjugated diene monomers; copolymer obtained by polymerizing the monomer mixture including the conjugated diene monomer, or the hydrogenated product thereof or so may be mentioned. As said conjugated diene, for example, 1,3-butadiene, 2-methyl-1,3-butadiene, 2,3-dimethyl-1,3-butadiene, 2-ethyl-1,3-butadiene, 2-chlor-1,3-butadiene, 1,3-pentadiene, 1,3-hexadiene, and 2,4-hexadiene or so may be mentioned. Among these, 1,3-butadiene, 2-methyl-1,3-butadiene are preferable. Note that, conjugated diene monomer may be used singularly, or by combining two or more types thereof in arbitrary ratio. The ratio of the conjugated diene monomer unit in the diene polymer is preferably 20 wt % or more and 60 wt % or less, and preferably 30 wt % or less and 55 wt % or less.

Said diene polymer may include, besides the conjugated diene monomer, the structural unit formed by polymerizing the nitrile group containing monomer (hereinafter, it may be referred as "nitrile group containing monomer unit"). As specific examples of the nitrile group containing monomer, α,β-unsaturated nitrile compound such as acrylonitrile, methacrylonitrile, α-chloroacrylonitrile, α-ethylacrylonitrile or so may be mentioned, and among these, acrylonitrile is preferable. The ratio of the nitrile group containing monomer unit of the diene polymer is preferably 5 to 40 wt %, more preferably 5 to 30 wt %. By setting the amount of the nitrile group containing monomer unit within the above mentioned range, the obtained negative electrode strength is further improved. Note that, nitrile group containing monomer may be used only by one type or two types or more may be combined for use in arbitrary ratio.

Also, in said diene polymer, besides the above mentioned monomer unit, other structural unit formed by polymerizing other monomer may be included. As other monomer, unsaturated carboxylic acids such as acrylic acid, methacrylic acid, itaconic acid, fumaric acid or so; styrene based monomers such as styrene, chlorostyrene, vinyl toluene, t-butyl styrene, vinyl benzoate, methyl vinyl benzoate, vinyl naphthalene, chloromethylstyrene, hydroxymethylstyrene, α-methylstyrene, divinylbenzene or so; olefins such as ethylene, propylene or so; vinyl esters such as vinyl acetate, vinyl propionate, vinyl lactate, vinyl benzoate or so; amide monomers such as acrylic amide, N-methylolacrylic amide, acrylic amide-2-methylpropane sulfonate or so; vinyl ethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, isopropenyl vinyl ketone or so; heterocycle containing vinyl compounds such as N-vinyl pyrrolidone, vinyl pyridine, vinyl imidazole or so may be mentioned. Note that, said other monomer respectively may be used alone or by combining two or more thereof in arbitrary ratio.

Said acrylate polymer is the polymer including monomer unit (hereinafter, it may be referred as "(meth)acrylate monomer unit") formed by polymerizing the monomer derived from the compound expressed by the general formula (1): $CH_2=CR^1-COOR^2$ (in said formula, $R^1$ is hydrogen atom or methyl group, $R^2$ is alkyl group or cycloalkyl group). As the specific example of the unit constituting (meth)acrylate monomer unit, acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, lauryl acrylate, stearyl acrylate or so; methacrylates such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, lauryl methacrylate, stearyl methacrylate or so may be mentioned. Among these, acrylates are preferable, and n-butyl acrylate and 2-ethylhexyl acrylate are particularly preferable as these can improve the negative electrode strength. The ratio of the (meth)acrylate monomer unit in the acrylate polymer is usually 50 wt % or more, and more preferably 70 wt % or more. When the acrylate polymer having the ratio of (meth) acrylate monomer unit within said range, the heat resistance can be made high, and the internal resistance of the obtained lithium ion secondary battery can be made small.

Said acrylate polymer preferably includes nitrile group containing monomer unit besides (meth)acrylate monomer unit. As for the nitrile group containing monomer, acrylonitrile or methacrylonitrile or so may be mentioned; however acrylonitrile is preferable since the binding property between the current collector and the negative electrode active material layer is enhanced, and the negative electrode strength can be improved. The ratio of the nitrile group containing monomer unit in the acrylate polymer is preferably 5 to 35 wt %, and more preferably 10 to 30 wt %. When the amount of the nitrile group containing monomer unit is within the above mentioned range, the obtained negative electrode strength is further improved.

In said acrylate polymer, besides the above mentioned monomer unit, monomer unit formed by polymerizing the copolymerizable carboxylic acid group containing monomer may be included (hereinafter, it may be referred as "carboxylic acid group containing monomer unit"). As the specific example of the carboxylic acid containing monomer, a monobasic acid containing monomer such as acrylic acid and methacrylic acid or so; and a dibasic acid monomer such as maleic acid, fumaric acid, itaconic acid or so may be mentioned. Among these, the dibasic acid containing monomer is preferable, and itaconic acid is particularly preferable since the binding property between the current collector can be enhanced, and the negative electrode strength can be improved. These monobasic acid containing monomer and dibasic acid containing monomer can be used alone or by combining two or more. The ratio of the carboxylic acid containing monomer unit in the acrylate polymer is preferably 1 to 50 wt %, more preferably 1 to 20 wt %, and particularly preferably 1 to 10 wt %. When the amount of the carboxylic acid containing monomer unit is within the above mentioned range, the obtained negative electrode strength can be further improved.

Further, said acrylate polymer may include the structural unit obtained by polymerizing other copolymerizable monomer. As said other monomer, carboxylic acids esters comprising two or more carbon-carbon double bonds such as ethyleneglycoldimethacrylate, diethyleneglycoldimethacrylate, trimethylolpropane triacrylate or so; unsaturated esters comprising fluorine at the side chain such as perfluorooctylethyl acrylate, perfluorooctylethyl methacrylate or so; styrene monomers such as styrene, chlorostyrene, vinyl toluene, t-butyl styrene, vinyl benzoate, methyl vinyl benzoate, vinyl naphthalene, chloromethylstyrene, hydroxymethylstyrene, α-methylstyrene, divinylbenzene or so; amide based monomers such as acrylic amide, N-methylolacrylic amide, acrylic amide-2-methylpropane sulfonate or so; olefins such as ethylene, propylene or so; diene monomers such as butadiene, isoprene or so; halogen atom containing monomer such as vinyl chloride, vinylidene chloride or so; vinyl esters such as vinyl acetate, vinyl propionate, vinyl lactate, vinyl benzoate or so; vinyl ethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, isopropenyl vinyl ketone or so; heterocycle containing vinyl compounds such as N-vinyl pyrrolidone, vinyl pyridine, vinyl imidazole or so; glycidyl ethers such as allylglycidyl ethers or so; glycidyl esters such as glycidyl acrylate, glycidyl methacrylate or so may be mentioned. The ratio of other copolymerizable monomer unit in the acrylate polymer may be regulated accordingly depending on the purpose of the use.

Besides the above mentioned, as the negative electrode binder, vinyl polymers such as polyethylene, polypropylene, polyisobutylene, polyvinyl chloride, polyvinylidene chloride, polyvinylidene fluoride, polytetrafluoroethylene, polyvinyl acetate, polyvinyl alcohol, polyvinyl isobutyl ether, polyacronitrile, polymethacrylonitrile, polymethylmethacrylate, polymethylacrylate, polyethylmethacrylate, polyallyl acetate, polystyrene or so; ether polymers containing hetero atom in the main chain such as polyoxymethylene, polyoxyethylene, polycyclicthioether, polydimethylsiloxane or so; the condensed ester polymers such as polylactone, polycyclic anhydride, polyethylene terephthalate, polycarbonate or so; condensed amide polymer such as nylon 6, nylon 66, poly-m-phenyl-isophthalamide, poly-p-phenyleneterephthalamide, polypyromellitimide or so may be mentioned.

The shape of the negative electrode binder is not particularly limited, however a particulate form is preferable since the adhesiveness with the current collector is good, and the decline of the capacity of the negative electrode due to the repeating charge and discharge can be suppressed. The particulate form binder may be those which can maintain and exist in the particulate from while dispersed in the dispersing medium; and it is preferably that exist while maintaining the particulate form in the negative electrode active layer. In the present invention, "the state of remaining the particulate form" does not have to be a state where it has maintained a complete particulate form, but it only needs to maintain some level of particulate form. As for the particulate binder, for example, those wherein the particle of the binder such as latex or so being dispersed in a water, or the powder obtained by drying such dispersion may be mentioned.

The glass transition temperature (Tg) of the negative electrode binder is preferably 50° C. or less, and further preferably it is −40 to 0° C. When the glass transition temperature (Tg) of the binder is within this range, the adhesiveness is excellent even in a small amount, the negative electrode strength is excellent, is flexible and the negative electrode density by the pressing step during the negative electrode forming can be enhanced.

When the negative electrode binder is the particulate form binder, the number average particle diameter thereof is not particularly limited, and usually it is 0.01 to 1 µm, preferably 0.03 to 0.8 µm, and more preferably 0.05 to 0.5 µm. When the number average particle diameter of the binder is within this range, an excellent adhesive force can be provided to the negative electrode active material layer even in a small amount. Here, the number average particle diameter is obtained by measuring 100 binder particles which are selected arbitrarily from the image of the transmission electron microscope, and then by calculating the arithmetic average thereof. The shape of the particle may be spherical shape or atypical shape. These binders may be used alone or by combining two or more thereof.

The amount of the negative electrode binder is usually 0.1 to 50 parts by weight, more preferably 0.5 to 20 parts by weight and further preferably 1 to 10 parts by weight with respect to 100 parts by weight of the negative electrode active material. When the amount of the binder is within this range, the adhesiveness between the obtained negative electrode active material layer and the current collector can be secured, and the capacity of the lithium ion secondary battery can be made high while the internal resistance is made low.

(c) The Conductive Material

The negative electrode active material layer may comprise the conductive material. The particle diameter of the conductive material included in the negative electrode active material is 5 to 40 nm, preferably 10 to 38 nm, and more preferably 15 to 36 nm in terms of the number average particle diameter. As the conductive material, the conductive carbon such as acetylene black, Ketjen black, carbon black, graphite, vapor-grown carbon fiber and carbon nanotube or so can be used. By comprising the conductive material, it is possible to improve electrical contact between the negative electrode active materials, and to improve discharge rate characteristic when used for a lithium ion secondary battery. The content of the conductive material is preferably 1 to 20 parts by weight, more preferably 1 to 10 parts by weight with respect to 100 parts by weight of the negative electrode active material.

Other Negative Electrode Component

Also, in the negative electrode active material layer, as an arbitrary component, a reinforcement material, a leveling agent, electrolytic additives having a function to suppress the electrolytic solution decomposition or so may be further included; and further the viscosity thickener included in the negative electrode slurry may be remained.

As the viscosity thickener, among the above mentioned, from the point of excellent stability of the negative electrode slurry and the suppression of the expansion of the negative electrode, cellulose compounds (including the ammonium salts and alkali metal salts thereof), polysulfonic acid, polycarboxylic acid, copolymer of acrylic acid or methacrylic acid (including ammonium salts and alkalimetal salts thereof) are preferable. Here, a copolymer of acrylic acid or methacrylic acid (including ammonium salts and alkalimetal salts thereof) can be used by copolymerizing the copolymerizable component other than acrylic acid or methacrylic acid such as methyl acrylate or methyl methacrylate or so.

The content of the viscosity thickener of the negative electrode slurry is preferably 0.05 to 10 parts by weight and more preferably 0.08 to 3 parts by weight with respect to 100 parts by weight of the negative electrode active material.

The Production Method of the Slurry for the Lithium Ion Secondary Battery Negative Electrode The slurry for the lithium ion secondary battery negative electrode is obtained by mixing the above mentioned negative electrode active material (a), the negative electrode binder (b), the conductive material (c) and other arbitrary component in the dispersing medium. As the dispersing medium, cyclic aliphatic hydrocarbons such as cyclopentane and cyclohexane or so; aromatic hydrocarbons such as toluene, xylene and ethylbenzene or so; ketones such as acetone, ethylmethyl ketone, diisopropyl ketone, cyclohexanone, methylcyclohexanone, ethylcyclohexanone or so; chlorine based aliphatic hydrocarbons such as methylene chloride, chloroform, and carbon tetrachloride or so; esters such as ethyl acetate, butyl acetate, γ-butyrolactone, ε-caprolactone or so; alkylnitriles such as acetonitrile, propionitrile or so; ethers such as tetrahydrofurane, ethyleneglycoldiethylether or so; alcohols such as methanol, ethanol, isopropanol, ethyleneglycol, ethyleneglycolmonomethylether or so;

amides such as N-methylpyrrolidone and N,N-dimethylformamide or so may be mentioned.

These dispersing medium may be used alone or as the mixture solvent by mixing two or more thereof. Among these, the dispersing medium having excellent dispersibility of each component, low boiling point and high volatility is preferable, since it can be removed in short period of time and at low temperature. Specifically, acetone, toluene, cyclohexanone, cyclopentane, tetrahydrofurane, cyclohexane, xylene, water or N-methylpyrrolidone, or the mixture solvent thereof is preferable.

The mixing method is not particularly limited, however for example the mixing device using stirring method, shaking method, and rotational method or so may be mentioned. Also, the method of using the homogenizer, ball mill, sand mill, roll mill and dispersing kneader such a planetary kneader or so may be mentioned.

The Lithium Ion Secondary Battery Negative Electrode

The lithium ion secondary battery negative electrode is made by coating and drying the aforementioned slurry for the lithium ion secondary battery negative electrode on the current collector.

The production method of the lithium ion secondary battery negative electrode includes the step of coating and drying the negative electrode slurry on one side or both sides of the current collector thereby forming the negative electrode active material layer.

The method for coating the negative electrode slurry onto the current collector is not particularly limited. For example, a doctor blade method, a dip method, a reverse roll method, a direct roll method, a gravure method, an extrusion method, a brush method or so may be mentioned.

As the drying method, for example, drying by warm air, hot air or low wet air, vacuum drying, drying method with irradiation of (far-) infrared rays, electron beam or so may be mentioned. The drying time is usually 5 to 30 minutes, and the drying temperature is usually 40 to 180° C.

When producing the lithium ion secondary battery negative electrode, it is preferable to comprise the step of reducing the porosity of the negative electrode active material layer by a pressure applying treatment using the metal press or roll press or so. The porosity of the negative electrode active material layer is preferably 5 to 30%, and more preferably 7 to 20%. If the porosity of the negative electrode active material layer is too high, the charging efficiency or the discharging efficiency may deteriorate in some case. On the other hand, if the porosity of the negative electrode active material layer is too low, then the high volume capacity becomes difficult to obtain, and the negative electrode active material layer easily falls off from the current collector hence the malfunction may easily occur in some case. Further, in case of using the curable polymer as the negative electrode binder, it is preferable to cure.

The thickness of the electrode active material layer is, for negative electrode, normally 5 to 300 μm, preferably 30 to 250 μm. By having the thickness of the negative electrode active material layer within the above mentioned range, the lithium ion secondary battery having high load characteristic and cycle characteristic can be obtained.

The content ratio of the negative electrode active material in the negative electrode active material layer is preferably 85 to 99 wt %, more preferably 88 to 97 wt %. When the content ratio of the negative electrode active material in the negative electrode active material layer is within said range, the lithium ion secondary battery with flexibility and binding property while exhibiting high capacity can be obtained.

The density of the negative electrode active material layer is preferably 1.6 to 2.2 g/cm$^3$, and more preferably 1.65 to 1.85 g/cm$^3$. When the density of the negative electrode active material layer is within the above range, the lithium ion secondary battery having high capacity can be obtained.

The current collector is not particularly limited as long as it is the material which has electric conductivity and electrochemical durability. However, the metal material having heat resistance is preferable, and for example iron, copper, aluminum, nickel, stainless steel, titanium, tantalum, gold, platinum or so may be mentioned. Among these, copper is particularly preferable as the current collector used for the lithium ion secondary battery negative electrode.

The shape of the current collector is not particularly limited, however the sheet form having a thickness of 0.001 to 0.5 mm or so is preferable. It is preferable that the current collector is used by carrying out the roughening treatment in advance in order to increase the adhesive strength of the negative electrode active material layer. As the roughening method, a mechanical polishing, electropolishing, chemical polishing or so may be mentioned. As the mechanical polishing, the coated abrasive having fixed abrasive particles, the grinding stone, the emery buff, the wire-brush provided with steel wire and or so can be used. Also, a primer layer may be formed on the surface of the current collector to increase the adhesive strength and the conductivity of the negative electrode active material layer.

Non-Aqueous Electrolytic Solution

As the non-aqueous electrolytic solution, it is not particularly limited, and those dissolving the lithium salt as the supporting electrolytes in the non-aqueous solvent can be used. As the lithium salt, for example, LiPF$_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, (C$_2$F$_5$SO$_2$)NLi or so may be mentioned. Particularly, LiPF$_6$, LiClO$_4$, CF$_3$SO$_3$Li, which easily dissolves in the solvent and has high degree of dissociation are preferable. These may be used alone, or by mixing two or more thereof. The amount of the supporting electrolyte is usually 1 wt % or more, more preferably 5 wt % or more, and usually 30 wt % or less and more preferably 20 wt % or less. The ionic conductivity will be compromised, and the charging characteristic and discharging characteristic of the lithium ion secondary battery will decline, if the amount of the supporting electrolytes are too small or too much.

The solvent used for the electrolytic solution is not particularly limited, as long as it dissolves the supporting electrolyte, and usually alkyl carbonates such as dimethyl carbonate (DMC), ethylene carbonate (EC), diethyl carbonate (DEC), propylene carbonate (PC), butylene carbonate (BC), methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be preferably used. Dimethyl carbonate, ethylene carbonate, propylene carbonate, diethyl carbonate and methylethyl carbonate are preferable, since the high ionic conductivity can be easily obtained, and the using temperature range is wide. These may be used alone, or by mixing two or more thereof.

As for the electrolytic solution besides the above mentioned, gel form polymer electrolytes wherein the polymer electrolytes such as polyethyleneoxide and polyacrylonitrile or so are immersed in the electrolytic solution, or inorganic solid electrolytes such s lithium sulfide, LiI, Li$_3$N or so may be mentioned.

Also, the electrolytic solution may comprise the additive for use. As for the additives, besides the carbonate based compound such as vinylene carbonate (VC), fluorine containing carbonate such as fluoroethylene carbonate or so, ethylmethyl sulfone or so are preferable. Among these, fluorine based electrolytic solution additives have high voltage resistance. As the capacity has become larger and the voltage during the charge-discharge has become high, the above mentioned electrolytic solution additives such as ethylene carbonate or propylene carbonate may be blended into the electrolytic solution, since the electrolytic solution made of ethylene carbonate or propylene carbonate may not withstand the high voltage and may decompose.

Separator

The separator is the porous substrate comprising pore parts, and as the usable separator, (a) the porous separator comprising the pore part, (b) the porous separator formed with the polymer coat layer on one side or both sides, or (c) the porous separator formed with the porous resin coat layer including the inorganic ceramic powder or so may be mentioned. As non-limiting examples of these, porous separators of polypropylenes, polyethylenes, polyolefins, or aramids or so; the separator coated with a polymer film for a solid polymer electrolyte or a gel polymer electrolyte and a separator coated with a gelated polymer coat layer made of, such as polyvinylidene fluoride, polyethylene oxide, polyacrylonitrile, or polyvinylidene fluoride-hexafluoropropylene copolymer, and a separator coated with a porous membrane layer formed of an inorganic filler and a dispersant for an inorganic filler may be mentioned.

The Production Method of the Lithium Ion Secondary Battery

The method for producing the lithium ion secondary battery of the present invention is not particularly limited. For example, the aforementioned positive electrode and negative electrode are stacked against each other via the separator, then this may be wound, folded or so depending on the shape of the battery, and then placed in a battery case, followed by introducing the electrolytic solution into the battery case and seal. Further, if necessary, expanded metal, an overcurrent prevention element such as a fuse and a PTC element, a lead plate or so may also be placed, to prevent an increase of the internal pressure in the battery, and to prevent overcharge/discharge. The shape of the battery may be any of a laminate cell type, coin type, button type, sheet type, cylinder type, horn shape, flat type, and wound type. Particularly, according to the present invention, the positive electrode active material layer is flexible, hence the positive electrode active material layer does not crack when bending, thus it can be used preferably for the production of the wound type pouch cell.

EXAMPLE

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

(The Measurement of the Non-Aqueous Electrolytic Solution Swelling Degree)

N-methyl pyrrolidone (NMP) solution of 8% nitrile group containing acrylic polymer was placed in the Teflon™ petri dish so that the thickness after drying is 100 μm, thereby the polymer film was formed. The obtained film was punched out in 16 mmϕ and the weight was measured (the weight was defined as "A"). 5% fluoroethylene carbonate was mixed with the mixture having ethylene carbonate and ethylmethyl carbonate by a weight ratio of 3 to 7, then lithium hexafluorophosphate ($LiPF_6$) was dissolved so that the concentration becomes 1 mol/litter, thereby the non-aqueous electrolytic solution was prepared. The film punched out in 16 mmϕ was immersed in 20 g of non-aqueous electrolytic solution, then it was completely swelled at 60° C. taking 72 hours. Then, the swollen film was taken out, and the non-aqueous electrolytic solution on the surface was wiped lightly, then the weight was measured (the weight was defined as "B"). The non-aqueous electrolytic solution swelling degree (=B/A) was determined based on these values. The larger the non-aqueous electrolytic solution swelling degree is, the more significant the deformation is in the non-aqueous electrolytic solution swelling degree.

(The Measurement of THF Insoluble Amount)

N-methyl pyrrolidone (NMP) solution of 8% nitrile group containing acrylic polymer was placed in the Teflon™ petri dish so that the thickness after drying is 100 μm, thereby the polymer film was formed. The obtained film was punched out in 16 mmϕ and the weight was measured (the weight was defined as "C"). The film punched out in 16 mmϕ was immersed in 20 g of tetrahydrofuran to completely dissolve the soluble part at 25° C. taking 24 hours. Then, the residual solids which are the insoluble part was taken out, and after the tetrahydrofuran is completely evaporated by infrared drier, the weight was measured (the weight was defined as "D"). THF insoluble amount (=D/C×100) was determined from these values. The smaller the THF insoluble amount is, the lesser the crosslinking is between the polymers.

(The Measurement of the Weight Average Molecular Weight)

130 mg of NMP solution of 8% nitrile group containing acrylic polymer was dissolved in 5 mL DMF (N,N-dimethylformamide), then the measurement was carried out. For the measurement, the gel permeation chromatography was used, and TSKgel α-M, α-3000 (ϕ 7.8 mm×30 cm) made by TOSHO Corporation was used as the column. Based on the obtained data, the number average molecular weight was calculated; thereby the weight average molecular weight was obtained.

(The Viscosity of the Positive Electrode Slurry)

Using the coaxial double cylinder type viscometer made by Brookfield Corporation, and using spindle SC4-14 and chamber SC4-6RP, the viscosity (25° C.) of the positive electrode slurry after 30 seconds for each shear speed (2 $sec^{-1}$ and 20 $sec^{-1}$) were measured.

(The Smoothness of the Coated Electrode)

The coated amounts of 10 points were measured per 10 mm in lengthwise direction of the sheet form positive electrode. The difference between the minimum value and the maximum value of the 10 points were evaluated in A to C according to the below described evaluation method. The smaller the difference between the minimum value and the maximum value is, the more excellent the smoothness is, that is it indicates of having excellent target accuracy.

A . . . Less than 0.5 $mg/cm^2$
B . . . 0.5 $mg/cm^2$ or more and less than 2 $mg/cm^2$
C . . . 2 $mg/cm^2$ or more (The Initial Capacity)

The obtained lithium ion secondary battery was carried out with constant current charging under the condition of 25° C. until the battery voltage reached 4.2 V at 140 mA; then the constant current charging was carried out until the charging current at 4.2 V reached 14 mA. Then, the constant current discharging was carried out until the battery voltage at 140 mA reached 3 V, thereby the initial capacity was determined. The initial capacity at this time was evaluated in accordance with the below evaluation.

A . . . 700 mAh or more
B . . . 697 mAh or more and less than 700 mAh
C . . . 694 mAh or more and less than 697 mAh
D . . . 690 mAh or more and less than 694 mAh
E . . . Less than 690 mAh (The Output Capacity)

The lithium ion secondary battery which has been measured with the initial capacity was carried out with constant current charging under the condition of 25° C. until the battery voltage reached 4.2 V at 140 mA; then the constant current charging was carried out until the charging current at 4.2 V reached 14 mA. Then, the constant current discharging was carried out until the battery voltage at 1400 mA reached 3 V, and thereby this was defined as 2C capacity. The value of (2C capacity)/(the initial capacity)×100 was determined as the output characteristic, and it was evaluated according to the below evaluation.

A . . . 90% or more
B . . . 87% or more and less than 90%
C . . . 84% or more and less than 87%
D . . . 80% or more and 84% or less
E . . . Less than 80%

(The High Electrical Potential Cycle Characteristic)

For the lithium ion secondary battery which has been evaluated for the output characteristic, under the atmosphere of 25° C., the charging was carried out until the battery voltage at 600 mA reached 4.4 V, then discharged till the battery voltage at 600 mA reached 3 V; and this was carried out for 100 repeats. Then, the ratio of the discharge capacity at $100^{th}$ cycle against the discharge capacity at first cycle was obtained, then it was evaluated according to the below standard.

A . . . 80% or more
B . . . 77% or more and less than 80%
C . . . 74% or more and less than 77%
D . . . 70% or more and less than 74%
E . . . Less 70%

Also, the positive electrode active material, the positive electrode binder and the conductive material are as follows. Here, in the below description, the particle diameter of the active material refers to the volume average particle diameter, and the particle diameter of the conductive material refers to the number average particle diameter.

(The Positive Electrode Active Material A)
LCO: lithium cobalt oxide ($LiCoO_2$) (the particle diameter: 12 μm)
NCM: lithium nickel cobalt manganese oxide ($Li(CoMnNi)O_2$) (the particle diameter: 15 μm)
(The Positive Electrode Active Material C)
AB: Acetylene black (Denka black powder form product made by DENKI KAGAKU KOGYO KABUSHIKI KAISHA: the particle diameter 35 nm, the specific surface area 68 m$^2$/g)
KB: Ketjen black (Ketjen black made by Ketjen black International Co.: the particle diameter 40 nm, the specific surface area 800 m$^2$/g)
(The Positive Electrode Binder B)
Nitrile group containing acrylic polymer (B1-1) to (B1-7) were prepared as shown in below.

The Preparation Example 1

The Production of the Nitrile Group Containing Acrylic Polymer (B-1)

To the autoclave with stirrer, 164 parts of ion exchange water, 59.5 parts of 2-ethylhexyl acrylate (2EHA), 20 parts of methacylic acid (MAA), 20 parts of acrylonitrile (AN), 0.5 parts of 2-acrylamide-2-methylpropane sulfonate (AMPS), 0.3 parts of potassium persulfate as the polymerization initiator, 1.6 parts of sodium lauryl sulfate as the surfactant were introduced, after thoroughly dispersing it, the polymerization was carried out by heating for 3 hours at 70° C. and 2 hours at 80° C., thereby the aqueous dispersion of the nitrile group containing acrylic polymer (B1-1) was obtained. Note that, the polymerization conversion rate obtained from the solid concentration was 96%. Also, 500 parts of N-methylpyrrolidone was added to 100 parts of this aqueous dispersion, after evaporating all of the water and remaining monomer under reduced pressure, 81 parts of N-methylpyrrolidone was evaporated, thereby NMP solution of 8 wt % polymer (B1-1) was obtained. Here, the non-aqueous electrolytic solution swelling degree was 1.7 times, THF insoluble amount was 10% or less, and the weight average molecular weight was 1400000.

The Preparation Examples 2 to 6

The same was carried out as the example 1, except that the used amount and type of the monomer were changed as shown in Table 1. Note that, for the production of nitrile group containing acrylic polymer (B1-3), 0.3 parts of t-dodecylmercaptan as the chain transferring agent was added. Also, for the production of the nitrile group containing acrylic polymer (B1-6), 0.5 parts of t-dodecylmercaptan as the chain transferring agent was added.

Also, in Table 1, AN is acrylonitrile, 2EHA is 2-ethylhexyl acrylate, MAA is methacrylic acid, AMPS is 2-acrylicamide-2-methylpropane sulfonate, AMA is allylmethacrylate, BD is 1,3-butadiene, and BA is butyl acrylate. The weight average molecular weight, the non-aqueous electrolytic solution swelling degree and THF insoluble amount are shown in Table 1.

The Preparation Example 7

The Production of the Nitrile Group Containing Acrylic Polymer (B1-7)

To the autoclave with the stirrer, 240 parts of the ion exchange water, 2.5 parts of sodium alkyl benzene sulfonate, 20 parts of acrylonitrile, and 35 parts of butylacrylate were introduced in this order, and the inside of the bottle was substituted with nitrogen. Then, 45 parts of 1,3-butadiene was pressure introduced, and 0.25 parts of ammonium persulfate was added to carry out the polymerization at the reaction temperature of 40° C., thereby the polymer comprising the nitrile group containing monomer unit, acrylate monomer unit, and conjugated monomer unit was obtained. The polymerization conversion rate was 85%, the iodine value was 280 mg/100 mg.

400 milliliter solution (the total solid portion of 48 gram) which was regulated to have 12 wt % of the total solid concentration using the water to said polymer, was introduced into the autoclave with the stirrer, and after the dissolved oxygen in the polymer was removed by flowing the nitrogen gas for 10 minutes, 75 mg of palladium acetate was added as the hydrogenation reaction catalyst by dissolving in 180 ml of water which is added with the nitric acid four times more of Pd. Then, the system was substituted with hydrogen gas for twice, then the content of the autoclave was heated to 50° C. while applying the pressure with hydrogen gas up to 3 MPa, then the hydrogenation reaction was carried out for 3 hours. Here, the iodine value of the polymer was 35 mg/100 mg.

Next, the autoclave was put back to atmospheric pressure, then 25 mg of palladium acetate was added as the hydrogenation reaction catalyst by dissolving in 60 ml of water which is added with the nitric acid four times more of Pd. Then, the system was substituted with hydrogen gas for twice, then the content of the autoclave was heated to 50° C. while applying the pressure with hydrogen gas up to 3 MPa, then the hydrogenation reaction was carried out for 3 hours.

Then, the content was put back to ambient temperature, and the inside of the system was made to nitrogen atmosphere. Then, the condensation was carried out until the solid concentration was 40% using the evaporator, thereby the aqueous dispersion of nitrile group containing acrylic polymer was obtained. Also, to 100 parts of this aqueous dispersion, 320 parts of N-methylpyrrolidone was added, then after evaporating all of the water and remaining monomer under reduced pressure, N-methylpyrrolidone was added, thereby NMP solution of 8 wt % polymer (B1-7) was obtained. The non-aqueous electrolytic solution swelling degree of the obtained polymer (B1-7) was 2.9 times, THF insoluble amount was 10% or less, the weight average molecular weight was 700000, and the iodine value was 10 mg/100 mg.

KYNAR720 made by ARKEMA Corporation) as the fluorine containing polymer of positive electrode binder, 0.32 parts, in solid equivalent amount, of NMP solution of 8 wt % polymer (B1-1) as the nitrile group containing acrylic polymer, and appropriate amount of NMP were added, thereby the blended product was obtained. Said blended product was kneaded for 60 minutes at the rotational speed of 60 rpm using planetary mixer and the condition that the shear strength during the solid kneading was 680 W/kg, thereby the thick paste was obtained. The solid concentration of the thick paste was 81%. Then, NMP was added, and the kneading was carried out for 20 minutes at the rotational speed of 60 rpm using planetary mixer, thereby the positive electrode slurry was prepared. The amount of NMP at this time was set to the amount so that the solid concentration of the positive electrode slurry was 76%. The viscosity of 2 $sec^{-1}$ and the viscosity of 20 $sec^{-1}$ of the obtained positive electrode slurry were 4800 mPa·s and 4000 mPa·s respectively; and the ratio of the viscosity (2 $sec^{-1}$/20 $sec^{-1}$) was 1.2.

As the current collector, the aluminum foil with the thickness of 15 nm was prepared. The above mentioned positive electrode slurry was coated on both sides of the

TABLE 1

| | Preparation example 1 | Preparation example 2 | Preparation example 3 | Preparation example 4 | Preparation example 5 | Preparation example 6 | Preparation example 7 |
|---|---|---|---|---|---|---|---|
| Polymer | B1-1 | B1-2 | B1-3 | B1-4 | B1-5 | B1-6 | B1-7 |
| AN | 20 | 20 | 20 | 20 | 20 | 20 | 20 |
| 2EHA | 59.5 | 65.5 | 53.5 | 53.4 | 59.3 | 59.5 | |
| MAA | 20 | 14 | 26 | 26 | 20 | 20 | |
| AMPS | 0.5 | 0.5 | 0.5 | 0.5 | 0.5 | 0.5 | |
| AMA | | | | 0.1 | 0.2 | | |
| BD | | | | | | | 45 |
| BA | | | | | | | 35 |
| Weight average molecular weight | 1400000 | 1300000 | 500000 | 2000000 | 2500000 | 500000 | 700000 |
| Swelling degree against nonaqueous electrolytic solution | 1.7 | 2.1 | 1.3 | 1.4 | 1.7 | 1.7 | 2.9 |
| THF insoluble amount (%) | 10 or less | 10 or less | 10 or less | 20 | 70 | 10 or less | 10 or less |

As fluorine containing polymer, those described in below were used.

Mixed PVdF: polyvinylidene fluoride (the mixture of 1:1 (weight ratio) of KYNAR HSV900 made by ARKEMA Corporation and KYNAR720 made by the same)

Note that, KYNAR HSV900 has the melt viscosity measured at ASTM D3835/232° C. 100 $sec^{-1}$ of 50 kpoise, and the melt viscosity of KYNAR720 was 9 kpoise.
The high molecular weight PVdF: KYNAR HSV900
The low molecular weight PVdF: KYNAR720
The melt viscosity of this mixture was 38 kpoise.

Example 1

[The Production of the Positive Electrode Slurry and the Positive Electrode]

To the planetary mixer having the capacity of 0.6 L, 100 parts of lithium cobalt oxide LCO ($LiCoO_2$) (the particle diameter: 12 μm) as the positive electrode active material, 2.0 parts of acetylene black (AB, Denka black powder form product made by DENKI KAGAKU KOGYO KABUSHIKI KAISHA: the particle diameter 35 nm, the specific surface area 68 $m^2$/g) as the positive electrode conductive material, 1.44 parts of mixed polyvinylidene fluoride of powder form (the mixture of 1:1 (weight ratio) of KYNAR HSV900 and aluminum foil so that the coated amount after the drying 25 mg/$cm^2$, then it was dried for 20 minutes at 60° C. and 20 minutes at 120° C., then 2 hours of heat applying treatment was carried out at 150° C., thereby the positive electrode was obtained. This positive electrode was stretched by applying a pressure by roll press, thereby the sheet form positive electrode comprising the positive electrode active material layer having the density of 3.9 g/$cm^3$ and the aluminum foil was produced. This was then cut to the size of the width of 4.8 mm and the length of 50 cm, and aluminum lead was connected. For the obtained sheet form positive electrode, the smoothness of the coated electrode was evaluated. The results are shown in Table 2.

[The Production of the Negative Electrode Slurry and the Negative Electrode]

90 parts of spherical artificial graphite (the particle diameter: 12 μm) and 10 parts of SiOx (the particle diameter: 10 μm) as the negative electrode active material, 1 part of styrene butadiene rubber (the particle diameter: 180 nm, the glass transition temperature: −40° C.) as the binder, 1 part of carboxymethyl cellulose as the viscosity thickening agent, and appropriate amount of water were stirred in the planetary mixer, thereby the negative electrode slurry was prepared.

As the current collector, the copper foil having the thickness of 15 μm was prepared. The above described negative electrode slurry was coated on both sides of the copper foil so that the coated amount after the drying is 10 mg/cm$^2$, then it was dried for 20 minutes at 60° C. and 20 minutes at 120° C., followed by 2 hours of the heat applying treatment at 150° C., thereby the negative electrode was obtained. This negative electrode was stretched by applying a pressure by a roll press, and thereby the sheet form negative electrode comprising the negative electrode active material layer having the density of 1.8 g/cm$^3$ and the copper foil was produced. This was then cut into a size having the width of 5.0 mm and the length of 52 cm, and the nickel lead was connected.

[The Production of the Lithium Ion Secondary Battery]

The obtained sheet form positive electrode and sheet form negative electrode were wound placing the separator in between using the core having the diameter of 20 mm, thereby the jelly roll (the electrode plate group) was obtained. As the separator, the polypropylene fine porous membrane having the thickness of 20 μm was used. The jelly roll was compressed from one direction at the speed of 10 mm/sec until the thickness was 4.5 mm. The ratio of the long diameter with respect to short diameter of said approximate oval was 7.7.

Also, 5 wt % fluoroethylene carbonate was mixed in the mixture of ethylene carbonate and ethylmethyl carbonate having by the weight ratio of 3 to 7, then lithium hexafluorophosphate was dissolved so that the concentration was 1 mol/litter, and then the vinylene carbonate 2 vol % was added, thereby the non-aqueous electrolytic solution was prepared.

Said electrode plate group was housed in the predetermined case made of aluminum laminate together with 3.2 g of non-aqueous electrolytic solution. Then, the negative electrode lead and the positive electrode lead were connected to the predetermined places, then the opening part of the case was sealed by heat, thereby lithium ion secondary battery of wound type pouch cell was made. This battery was a pouch shape having the width of 35 mm, the height of 48 mm, and the thickness of 5 mm, and the nominal capacity of the battery was 700 mAh. The initial capacity, the output characteristic and the high electrical potential cycle characteristic of the obtained lithium ion secondary battery are shown in Table 2.

Example 2

The same as the example 1 was carried out except that time for stirring the blended product with the planetary mixer was changed to 20 minutes during the production of the positive electrode slurry during the production of the positive electrode slurry. The result is shown in Table 2.

Example 3

The same as the example 1 was carried out except that the sear during the solid kneading of the blended product by the planetary mixer was changed to 1000 W/kg, and the time for stirring the blended product was changed to 20 minutes. The result is shown in Table 2.

Example 4

The same as the example 1 was carried out except that the positive electrode active material was changed to NCM (Li(Co Mn Ni)O$_2$) (the particle diameter: 15 μm), the positive electrode conductive material was changed to ketjen black (Ketjen black made by Ketjen black International Co.: the particle diameter 40 nm, the specific surface area 800 m$^2$/g), and to change the added amount of the positive electrode conductive material to 1.0 parts. The results are shown in Table 2.

Example 5

The same was carried out as the example 1 except for changing the added amount of the positive electrode conductive material to 3.0 parts. The results are shown in Table 2.

Example 6

The same as the example 1 was carried out except that the added amount of positive electrode binder, the mixed polyvinylidene fluoride (the mixture of 1:1 (weight ratio) of KYNAR HSV900 and KYNAR720 made by ARKEMA Corporation) as the fluorine containing polymer was changed to 0.96 parts, and the polymer (B1-1) as the nitrile group containing acrylic polymer to 0.24 parts in solid equivalent amount. The results are shown in Table 2.

Example 7

The same as the example 1 was carried out except that the added amount of positive electrode binder, the mixed polyvinylidene fluoride (the mixture of 1:1 (weight ratio) of KYNAR HSV900 and KYNAR720 made by ARKEMA Corporation) as the fluorine containing polymer was changed to 2 parts, and the polymer (B1-1) as the nitrile group containing acrylic polymer to 0.5 parts in solid equivalent amount. The results are shown in Table 2.

Examples 8 to 11

The same as the example 1 was carried out except that the nitrile group containing acrylic polymers (B1-2) to (B1-4), (B1-7) were used in place of the nitrile group containing acrylic polymer (B1-1) of the positive electrode binder. The results are shown in Table 2.

Example 12

The same was carried out as the example 1 except that the sear during the solid kneading of the blended product using the planetary mixer was changed to 400 W/kg during the production of the positive electrode slurry. The results are shown in Table 2.

Example 13

The same was carried out as the example 1 except that the sear during the solid kneading of the blended product using the planetary mixer was changed to 800 W/kg during the production of the positive electrode slurry. The results are shown in Table 2.

Comparative Example 1

The same was carried out as the example 1 except that the fluorine containing polymer of the positive electrode binder was not used, and 2 parts of the nitrile group containing acrylic polymer (B1-1) was used. The results are shown in Table 2.

Comparative Example 2

The same was carried out as the example 1 except that the nitrile group containing acrylic polymer of the positive electrode binder was not used, and 2 parts of the mixed polyvinylidene fluoride was used. The results are shown in Table 2.

Comparative Example 3

The same was carried out as the example 1 except that the modified acrylic rubber polymer (the product name: BM500B made by ZEON Corporation, the swelling degree against the non-aqueous electrolytic solution of 2.7 times, THF insoluble amount of 80%) was used in place of the nitrile group containing acrylic polymer (B1-1) of the positive electrode binder. The results are shown in Table 2.

Comparative Example 4

The same was carried out as the example 1 except that the added amount of the positive electrode conductive material was changed to 3.5 parts. The results are shown in Table 2.

Comparative Example 5

The same was carried out as the example 1 except that the added amount of positive electrode binder, the mixed polyvinylidene fluoride (the mixture of 1:1 (weight ratio) of KYNAR HSV900 and KYNAR720 made by ARKEMA Corporation) as the fluorine containing polymer was changed to 0.4 parts, and the polymer (B1-1) as the nitrile group containing acrylic polymer to 0.1 parts in solid equivalent amount. The results are shown in Table 2.

Comparative Example 6

The same was carried out as the example 1 except that the final solid concentration of the positive electrode slurry was changed to 80%. The results are shown in Table 2.

Comparative Examples 7 and 8

The same was carried out as the example 1 except that the nitrile group containing acrylic polymer (B1-5) or (B16) was used in place of the nitrile group containing polymer (B1-1) of the positive electrode binder. The results are shown in Table 2.

Comparative Example 9

The same was carried out as the example 1 except that the shear of the solid kneading of the blended product by the planetary mixer was changed to 1200 W/kg in the production of the positive electrode slurry. The results are shown in Table 2.

Comparative Example 10

The same as the example 1 was carried out except that the positive electrode slurry was prepared by stirring the blended product for 60 minutes it the solid concentration so that the shear during the kneading by the planetary mixer is 200 W/kg. The results are shown in Table 2.

TABLE 2

| | Example 1 | Example 2 | Example 3 | Example 4 | Example 5 | Example 6 | Example 7 |
|---|---|---|---|---|---|---|---|
| Positive electrode active material A | LCO | LCO | LCO | NCM | LCO | LCO | LCO |
| Positive electrode active material C | AB | AB | AB | KB | AB | AB | AB |
| Positive electrode binder B | | | | | | | |
| Nitrile group containing acrylic polymer | B1-1 | B1-1 | B1-1 | B1-1 | B1-1 | B1-1 | B1-1 |
| blended amount | 0.32 | 0.32 | 0.32 | 0.32 | 0.32 | 0.24 | 0.5 |
| Fluorine containing polymer | mixed PVdF | mixed PVdF | mixed PVdF | mixed PVdF | mixed PVdF | mixed PVdF | mixed PVdF |
| blended amount | 1.44 | 1.44 | 1.44 | 1.44 | 1.44 | 0.96 | 2 |
| Viscosity (mPa·s) of positive electrode slurry at shear speed of 2 sec−1 | 4800 | 8670 | 5880 | 9750 | 8800 | 8200 | 4920 |
| Viscosity (mPa·s) of positive electrode slurry at shear speed of 20 sec−1 | 4000 | 5100 | 4200 | 3900 | 4000 | 4100 | 4100 |
| Ratio of viscosity (2 sec$^{-1}$/20 sec$^{-1}$) | 1.2 | 1.7 | 1.4 | 2.5 | 2.2 | 2 | 1.2 |
| Production method of positive electrode slurry | Two step kneading | Two step kneading | Two step kneading | Two step kneading | Two step kneading | Two step kneading | Two step kneading |
| Shear (W/kg) during the solid kneading | 680 | 680 | 1000 | 680 | 680 | 680 | 680 |
| Stirring time (min) at solid kneading | 60 | 20 | 20 | 60 | 60 | 60 | 60 |
| Solid concentration (%) at solid kneading | 81 | 81 | 82 | 79 | 79 | 83 | 81 |
| Final solid concentration (%) | 76 | 74 | 75 | 72 | 72 | 78 | 73 |
| Smoothness of coated electrode | A | B | A | B | B | B | A |
| Initial capacity | A | A | A | A | B | A | B |
| Output characteristic | A | A | A | A | A | A | B |

TABLE 2-continued

| High electric potential cycle characteristic | A | B | B | A | A | A | A |
|---|---|---|---|---|---|---|---|

|  | Example 8 | Example 9 | Example 10 | Example 11 | Example 12 | Example 13 |
|---|---|---|---|---|---|---|
| Positive electrode active material A | LCO | LCO | LCO | LCO | LCO | LCO |
| Positive electrode active material C | AB | AB | AB | AB | AB | AB |
| Positive electrode binder B |  |  |  |  |  |  |
| Nitrile group containing acrylic polymer | B1-2 | B1-3 | B1-4 | B1-7 | B1-1 | B1-1 |
| blended amount | 0.32 | 0.32 | 0.32 | 0.32 | 0.32 | 0.32 |
| Fluorine containing polymer | mixed PVdF | mixed PVdF | mixed PVdF | mixed PVdF | mixed PVdF | mixed PVdF |
| blended amount | 1.44 | 1.44 | 1.44 | 1.44 | 1.44 | 1.44 |
| Viscosity (mPa · s) of positive electrode slurry at shear speed of 2 sec−1 | 5460 | 7800 | 4810 | 4560 | 5330 | 5740 |
| Viscosity (mPa · s) of positive electrode slurry at shear speed of 20 sec−1 | 4200 | 3900 | 3700 | 3800 | 4100 | 4100 |
| Ratio of viscosity (2 sec−1/20 sec−1) | 1.3 | 2 | 1.3 | 1.2 | 1.3 | 1.4 |
| Production method of positive electrode slurry | Two step kneading | Two step kneading | Two step kneading | Two step kneading | Two step kneading | Two step kneading |
| Shear (W/kg) during the solid kneading | 680 | 680 | 680 | 680 | 400 | 800 |
| Stirring time (min) at solid kneading | 60 | 60 | 60 | 60 | 60 | 60 |
| Solid concentration (%) at solid kneading | 81 | 81 | 81 | 85 | 79 | 81.5 |
| Final solid concentration (%) | 75 | 75 | 73 | 80 | 76 | 77 |
| Smoothness of coated electrode | A | B | A | A | B | B |
| Initial capacity | A | A | A | A | A | A |
| Output characteristic | A | A | A | A | B | A |
| High electric potential cycle characteristic | B | A | B | C | B | B |

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Positive electrode active material A | LCO | LCO | LCO | LCO | LCO | LCO | LCO | LCO | LCO | LCO |
| Positive electrode active material C | AB | AB | AB | AB | AB | AB | AB | AB | AB | AB |
| Positive electrode binder B |  |  |  |  |  |  |  |  |  |  |
| Nitrile group containing acrylic polymer | B1-1 | — | BM500B | B1-1 | B1-1 | B1-1 | B1-5 | B1-6 | B1-1 | B1-1 |
| blended amount | 2 | 0 | 0.32 | 0.32 | 0.1 | 0.32 | 0.32 | 0.32 | 0.32 | 0.32 |
| Fluorine containing polymer | — | mixed PVdF | mixed PVdF | mixed PVdF | mixed PVdF | mixed PVdF | mixed PVdF | mixed PVdF | mixed PVdF | mixed PVdF |
| blended amount | 0 | 2 | 1.44 | 1.44 | 0.4 | 1.44 | 1.44 | 1.44 | 1.44 | 1.44 |
| Viscosity (mPa · s) of positive electrode slurry at shear speed of 2 sec−1 | 5280 | 5040 | 11200 | 11700 | 13120 | 39000 | 11200 | 13860 | 11600 | 11400 |
| Viscosity (mPa · s) of positive electrode slurry at shear speed of 20 sec−1 | 4400 | 4200 | 4000 | 3900 | 4100 | 15000 | 4000 | 4200 | 4000 | 3800 |
| Ratio of viscosity (2 sec−1/20 sec−1) | 1.2 | 1.2 | 2.8 | 3 | 3.2 | 2.6 | 2.8 | 3.3 | 2.9 | 3 |
| Production method of positive electrode slurry | Two step kneading | Two step kneading | Two step kneading | Two step kneading | Two step kneading | Two step kneading | Two step kneading | Two step kneading | Two step kneading | One step kneading |
| Shear (W/kg) during the solid kneading | 680 | 680 | 680 | 680 | 680 | 680 | 680 | 680 | 1200 | 200 |
| Stirring time (min) at solid kneading | 60 | 60 | 60 | 60 | 60 | 60 | 60 | 60 | 60 | 60 |
| Solid concentration (%) at solid kneading | 85 | 77 | 81 | 80 | 83 | 81 | 81 | 81 | 82 | 75 |
| Final solid concentration (%) | 79 | 70 | 70 | 71 | 79 | 80 | 72 | 75 | 75 | 75 |
| Smoothness of coated electrode | A | A | C | C | C | C | C | C | B | C |

TABLE 2-continued

| | | | | | | | | | | |
|---|---|---|---|---|---|---|---|---|---|---|
| Initial capacity | E | C | B | C | B | E | C | C | C | E |
| Output characteristic | E | C | B | B | B | E | C | C | C | E |
| High electric potential cycle | B | E | E | E | E | E | E | E | E | E |

According to Table 1 and Table 2, for the examples which satisfy the requirements of the present invention, good results were obtained having good balance for all of the evaluations. On the other hand, for the comparative examples 1 and 2 which does not use the nitrile group containing acrylic polymer and the fluorine containing polymer together, deteriorated results were obtained for most of the evaluations, and particularly the initial capacity or the output characteristic were significantly deteriorated. Also, for the comparative example 3 using the modified acrylic rubber polymer of particulate form in place of the nitrile group containing acrylic polymer, the high electrical potential cycle characteristic were significantly deteriorated. Further, for the comparative examples 4 to 10 wherein the viscosity ratio measured by the coaxial cylinder type viscometer is out of the predetermined range, these showed poor results in all of the evaluations, and particularly the high electrical potential cycle characteristic were significantly deteriorated.

The invention claimed is:

1. A slurry for a lithium ion secondary battery positive electrode comprising a positive electrode active material, a binder, a conductive material, and N-methyl pyrrolidone, wherein
   said binder comprises a nitrile group containing acrylic polymer and a fluorine containing polymer,
   a ratio of a viscosity measured by a coaxial cylinder type viscometer ((the viscosity at a shear speed of 2 $sec^{-1}$)/(the viscosity at the shear speed of 20 $sec^{-1}$)) is 1.0 to 2.5,
   the viscosity at the shear speed of 2 $sec^{-1}$ measured by a coaxial cylinder type viscometer is 1,000 to 20,000 mPa·s, and the viscosity at the shear speed of 20 $sec^{-1}$ measured by a coaxial cylinder type viscometer is 1,000 to 8,000 mPa·s,
   the fluorine containing polymer is polyvinylidene fluoride,
   a weight average molecular weight of said nitrile group containing acrylic polymer is 100,000 to 2,000,000,
   a content of said binder is 0.8 to 3 parts by weight with respect to 100 parts by weight of the positive electrode active material,
   a content ratio of the nitrile group containing acrylic polymer in said binder is 5 to 50 wt %,
   a content of said conductive material is 1 to 3 parts by weight with respect to 100 parts by weight of the positive electrode active material,
   the nitrile group containing acrylic polymer contains 5 to 35 wt % of nitrile group containing monomer unit, and both of the nitrile group containing acrylic polymer and the fluorine containing polymer are dissolved in N-methyl pyrrolidone.

2. The slurry for the lithium ion secondary battery positive electrode as set forth in claim 1, wherein a melt viscosity of said fluorine containing polymer measured at a temperature of 232° C. and the shear speed of 100 $sec^{-1}$ is 10 to 100 kpoise.

3. The slurry for the lithium ion secondary battery positive electrode as set forth in claim 1, wherein the content of said conductive material is 1.5 to 2.5 parts by weight with respect to 100 parts by weight of the positive electrode active material.

4. The slurry for the lithium ion secondary battery positive electrode as set forth in claim 1, wherein a number average particle diameter of said conductive material is 5 to 40 nm.

5. A production method of the slurry for the lithium ion secondary battery positive electrode as set forth in claim 1 comprising
   a step of obtaining a thick paste having a solid concentration of 77 to 90 wt % by kneading the positive electrode, the nitrile group containing acrylic polymer, the fluorine containing polymer and conductive material in the organic solvent at 350 to 1000 W/kg for 15 to 120 minutes, and
   a step of obtaining a dispersion having the solid concentration of 70 to 76 wt % by diluting said thick paste by the organic solvent.

6. A production method of the lithium ion secondary battery positive electrode comprising a step of forming a positive electrode active material layer by coating and drying the slurry for the lithium ion secondary battery as set forth in claim 1.

7. A lithium ion secondary battery comprising a positive electrode, a negative electrode and non-aqueous electrolytic solution, and
   said positive electrode is the lithium ion secondary battery positive electrode obtained from the production method as set forth in claim 6.

8. The lithium ion secondary battery as set forth in claim 7 wherein said negative electrode comprises an alloy based active material.

9. The slurry for the lithium ion secondary battery positive electrode as set forth in claim 1, wherein the nitrile group containing acrylic polymer contains 35 to 85 wt % of (meth)acrylate monomer unit.

10. The slurry for the lithium ion secondary battery positive electrode as set forth in claim 1, wherein a ratio of the fluorine containing polymer with respect to 100 wt % of total amount of the binder is 70 to 85 wt %.

* * * * *

UNITED STATES PATENT AND TRADEMARK OFFICE
CERTIFICATE OF CORRECTION

PATENT NO. : 10,559,828 B2
APPLICATION NO. : 14/761210
DATED : February 11, 2020
INVENTOR(S) : Takumi Sugimoto et al.

Page 1 of 1

It is certified that error appears in the above-identified patent and that said Letters Patent is hereby corrected as shown below:

In the Specification

Column 10, Lines 41-42, please delete "30 wt % or more, more preferably 25 wt % or more, and particularly preferably 20 wt % or more" and insert --30 wt % or less, more preferably 25 wt % or less, and particularly preferably 20 wt % or less--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*